United States Patent
Hooda et al.

(10) Patent No.: US 11,671,450 B2
(45) Date of Patent: *Jun. 6, 2023

(54) DYNAMIC HONEYPOTS

(71) Applicant: Cisco Technology, Inc., San Jose, CA (US)

(72) Inventors: Sanjay Kumar Hooda, Pleasanton, CA (US); Anand Oswal, Pleasanton, CA (US); Nehal Bhau, San Jose, CA (US); Victor Moreno, Carlsbad, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/569,285

(22) Filed: Jan. 5, 2022

(65) Prior Publication Data

US 2022/0131898 A1 Apr. 28, 2022

Related U.S. Application Data

(63) Continuation of application No. 16/535,550, filed on Aug. 8, 2019, now Pat. No. 11,233,822.

(60) Provisional application No. 62/774,118, filed on Nov. 30, 2018.

(51) Int. Cl.
| | | |
|---|---|---|
| *H04L 9/40* | (2022.01) | |
| *H04L 47/125* | (2022.01) | |
| *H04L 45/02* | (2022.01) | |
| *H04L 45/50* | (2022.01) | |

(52) U.S. Cl.
CPC ........ *H04L 63/1491* (2013.01); *H04L 47/125* (2013.01); *H04L 63/1408* (2013.01); *H04L 63/1425* (2013.01); *H04L 63/1433* (2013.01); *H04L 45/04* (2013.01); *H04L 45/50* (2013.01)

(58) Field of Classification Search
None
See application file for complete search history.

(56) References Cited

U.S. PATENT DOCUMENTS

| | | | |
|---|---|---|---|
| 9,602,536 B1 * | 3/2017 | Brown, Jr | H04L 63/083 |
| 9,912,695 B1 * | 3/2018 | Chao | H04L 63/1425 |
| 10,044,675 B1 * | 8/2018 | Ettema | H04L 63/0227 |
| 10,594,729 B2 * | 3/2020 | Kraenzel | G06F 16/951 |
| 11,032,319 B1 * | 6/2021 | Roundy | G06F 21/62 |
| 2017/0048274 A1 * | 2/2017 | Quinlan | H04W 12/125 |
| 2017/0163682 A1 * | 6/2017 | Yu | H04L 63/1491 |

(Continued)

*Primary Examiner* — Lashonda Jacobs-Burton
(74) *Attorney, Agent, or Firm* — Polsinelli

(57) ABSTRACT

A mapping system, under administrative control of a Wide Area Network (WAN) controller, can track each host, authorized to access a plurality of Local Area Networks (LANs), in one or more mapping databases including a first network address representing an identifier and a second network addressing representing a locator for each host. The mapping system can receive a request for resolution of a first identifier of a host not presently connected to the network. The mapping system can determine the mapping databases exclude a mapping for the first identifier. The mapping system can update the mapping databases with a first mapping including the first identifier and a first locator corresponding to a honeypot network device. The mapping system can transmit, to one or more LANs of the plurality of LANs, routing information to route traffic destined for the first identifier to the honeypot network device.

20 Claims, 10 Drawing Sheets

(56) References Cited

U.S. PATENT DOCUMENTS

2018/0198822 A1* 7/2018 Brown, Jr ........... H04L 63/1491
2019/0230124 A1* 7/2019 Hodgman ............... H04L 67/12

* cited by examiner

DYNAMIC HONEYPOTS

CROSS-REFERENCE TO RELATED APPLICATIONS

This application is a continuation of U.S. Non-Provisional patent application Ser. No. 16/535,550, filed Aug. 8, 2019, which is now U.S. Pat. No. 11,233,822 and claims the benefit of U.S. Provisional Patent Application No. 62/774,118, filed Nov. 30, 2018, the contents of which are incorporated herein by reference in their entireties.

TECHNICAL FIELD

The subject matter of this disclosure relates in general to the field of computer networking, and more particularly, to systems and methods for improving end-to-end network security by dynamic generation of honeypots.

BACKGROUND

The enterprise network landscape is continuously evolving. There is a greater demand for mobile and Internet of Things (IoT) device traffic, Software as a Service (SaaS) applications, and cloud adoption. In addition, security needs are increasing and certain applications can require prioritization and optimization for proper operation. As this complexity grows, there is a push to reduce costs and operating expenses while providing for high availability and scale.

Conventional Wide Area Network (WAN deployments are facing major challenges under this evolving landscape. Conventional WAN deployments typically consist of multiple Multi-Protocol Label Switching (MPLS) transports, or MPLS paired with Internet or Long-Term Evolution (LTE) links used in an active/backup fashion, most often with Internet or SaaS traffic being backhauled to a central data center or regional hub for Internet access. Issues with these deployments can include insufficient bandwidth, high bandwidth costs, application downtime, poor SaaS performance, complex operations, complex workflows for cloud connectivity, long deployment times and policy changes, limited application visibility, and difficulty in securing the network.

In recent years, Software-Defined Wide-Area Network (SD-WAN) platforms have been developed to address these challenges. SD-WAN is part of a broader technology of software-defined networking (SDN). SDN is a centralized approach to network management which can abstract away the underlying network infrastructure from its applications. This de-coupling of data plane forwarding and control plane can allow a network operator to centralize the intelligence of the network and provide for more network automation, operations simplification, and centralized provisioning, monitoring, and troubleshooting. SD-WAN can apply these principles of SDN to the WAN.

BRIEF DESCRIPTION OF THE FIGURES

To provide a more complete understanding of the present disclosure and features and advantages thereof, reference is made to the following description, taken in conjunction with the accompanying drawings, in which.

DESCRIPTION OF EXAMPLE EMBODIMENTS

Figure 1:
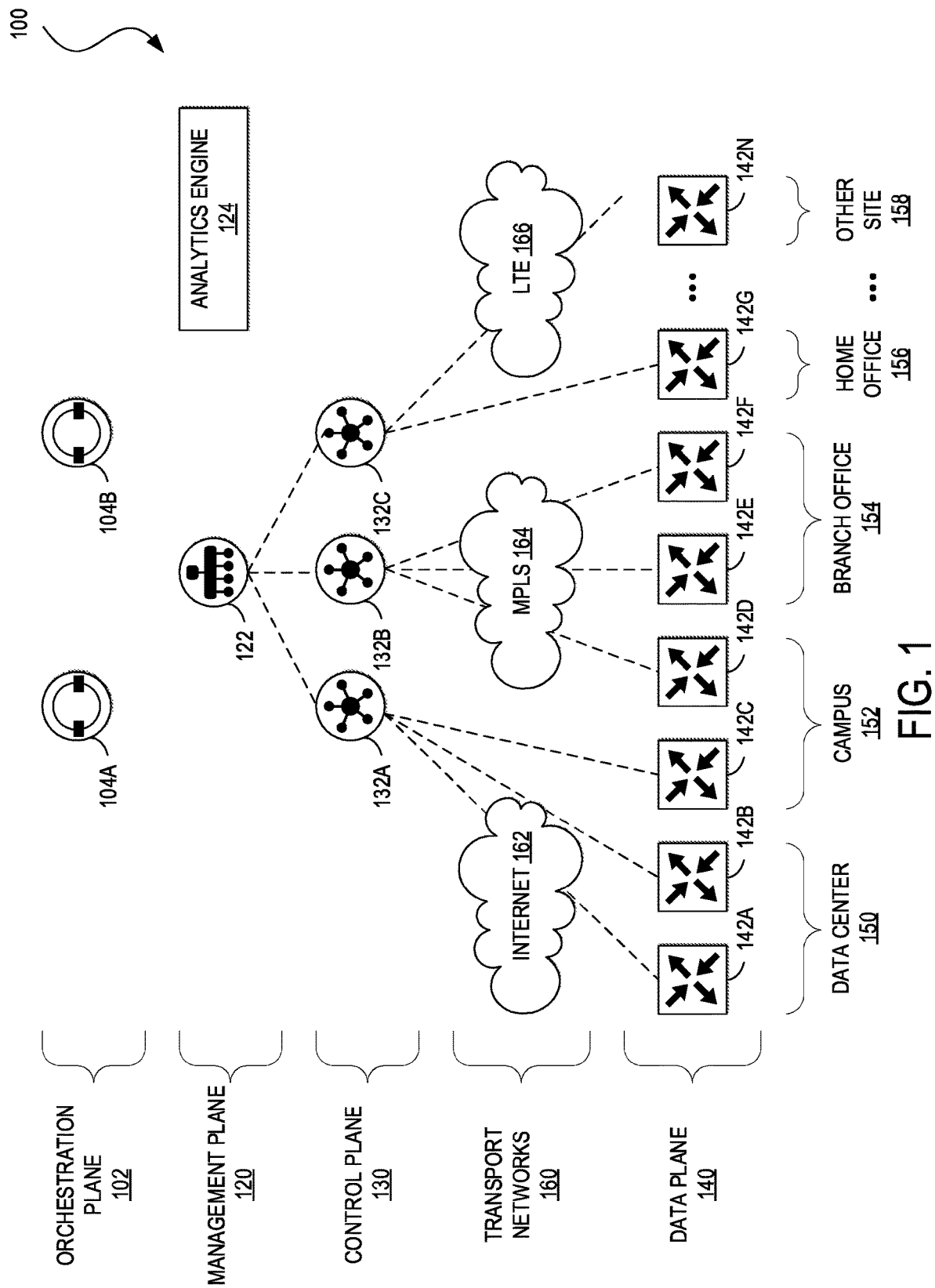
FIG. 1 illustrates an example of a Wide Area Network (WAN) platform in accordance with an embodiment.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

Systems and methods provide for improving end-to-end network security by dynamic generation of honeypots. A mapping system, under administrative control of a Wide Area Network (WAN) controller, can track each host, authorized to access a plurality of Local Area Networks (LANs) under administrative control of a LAN controller, in one or more mapping databases by at least a first network address representing an identifier for each host and a second network addressing representing a locator for each host. The mapping system can receive a request for resolution of a first identifier of a host not connected to the network. The mapping system can determine the mapping databases exclude a mapping for the first identifier. The mapping system can update the mapping databases with a first mapping including the first identifier and a first locator corresponding to a honeypot network device. The mapping system can transmit, to one or more LANs of the plurality of LANs, routing information to route traffic destined for the first identifier to the honeypot network device.

Example Embodiments

In some embodiments, a computer-implemented method is provided for tracking, by a mapping system under administrative control of a Wide Area Network (WAN) controller, each host, authorized to access a plurality of Local Area Networks (LANs) under administrative control of one or more LAN controllers, in one or more mapping databases by at least a first network address representing an identifier for each host and a second network addressing representing a locator for each host; receiving a request for resolution of a first identifier; determining the one or more mapping databases exclude a mapping for the first identifier; updating the one or more mapping databases with a first mapping including the first identifier and a first locator corresponding to a honeypot network device connected to a honeypot server; and transmitting, to one or more LANs of the plurality of LANs, routing information to route traffic destined for the first identifier to the honeypot network device.

The computer-implemented method can further comprise determining a host, authorized to access the plurality of LANs and assigned to the first identifier, has connected to a first access device of a first LAN of the plurality of LANs; updating the one or more mapping databases with a second mapping including the first identifier and a second locator corresponding to the first access device; and transmitting, to one or more LANs of the plurality of LANs, second routing information to route second traffic destined for the first identifier to the first access device.

The computer-implemented method can further comprise receiving a request for resolution of a second identifier; determining, from the one or more mapping databases, that the second identifier is assigned to a host that is authorized to access the plurality of LANs; determining, from the one or more mapping databases, that the host is not connected to the plurality of LANs; updating the one or more mapping databases with second mapping including the second identifier and a second locator corresponding to a null address; and transmitting, to one or more LANs of the plurality of LANs, second routing information to drop second traffic destined for the second identifier.

The computer-implemented method can further comprise provisioning a virtual server to operate as the honeypot server; and assigning the first identifier to the honeypot server. The computer-implemented method can further comprise transmitting, to the honeypot network device, information to perform a destination network address translation, on the traffic destined for the first identifier, from the first identifier to a network address of the honeypot server. The computer-implemented can further comprise determining that at least one of the honeypot server or the honeypot network device has insufficient capacity to process the traffic destined for the first identifier; and provisioning at least one of an additional instance of the honeypot server or an additional instance of the honeypot network device; and transmitting information to the honeypot network device to load-balance the traffic destined for the first identifier between at least one of the honeypot server and the additional instance of the honeypot server or the honeypot network device and the additional instance of the honeypot network device.

The computer-implemented method can further comprising transmitting, to the plurality of LANs, a traffic policing policy to limit transmission of a class of traffic corresponding to the first identifier, the honeypot server, or the honeypot network device.

In some embodiments, the one or more mapping databases further include virtual network segmentation information for each host. In some embodiments, the one or more mapping databases further include user or group identifier information for each host. In some embodiments, the honeypot server is located in a cloud service provider network.

The computer-implemented method can further configuring one or more WAN edge devices, under administrative control of the WAN controller, as Re-encapsulating Tunnel Routers (RTRs); and sharing, via the RTRs, mapping information between the mapping system and one or more second mapping systems under administrative control of the one or more LAN controllers.

The computer-implemented method can further comprise configuring one or more border devices, under administrative control of one or more LAN controllers of the plurality of LANs, as RTRs; and sharing, via the RTRs, mapping information between the mapping system and one or more second mapping systems under administrative control of the one or more LAN controllers via the RTRs.

In some embodiments, a system, under administrative control of a WAN controller, is provided comprising one or more processors; one or more mapping databases; and memory including instructions that, when executed by the one or more processors, cause the system to track each host, authorized to access a plurality of LANs under administrative control of one or more LAN controllers, in the one or more mapping databases by at least a first network address representing an identifier for each host and a second network addressing representing a locator for each host; receive a request for resolution of a first identifier; determine the one or more mapping databases exclude a mapping for the first identifier; update the one or more mapping databases with a first mapping including the first identifier and a first locator corresponding to a honeypot network device connected to a honeypot server; and transmit, to one or more LANs of the plurality of LANs, routing information to route traffic destined for the first identifier to the honeypot network device.

In some embodiments, a non-transitory computer-readable storage medium is provided including instructions that, when executed by one or more processors of a system, under administrative control of a WAN controller, cause the system to track each host, authorized to access a plurality of LANs under administrative control of one or more LAN controllers, in one or more mapping databases by at least a first network address representing an identifier for each host and a second network addressing representing a locator for each host; receive a request for resolution of a first identifier; determine the one or more mapping databases exclude a mapping for the first identifier; update the one or more mapping databases with a first mapping including the first identifier and a first locator corresponding to a honeypot network device connected to a honeypot server; and transmit, to one or more LANs of the plurality of LANs, routing information to route traffic destined for the first identifier to the honeypot network device. Numerous other functions and advantages are described and suggested below as may be provided in accordance with the various embodiments.

An overlay network (sometimes also referred to as a network fabric) is a virtual network environment, built on top of an underlying physical network (i.e., the underlay network). An overlay network can create a logical topology used to virtually connect devices built on top of an arbitrary physical network environment. Some example approaches for implementing overlay networks include Generic Routing Encapsulation (GRE) or Multipoint GRE (mGRE), Multi-Protocol Label Switching (MPLS) Virtual Private Network (VPN), Virtual Private Local Area Network Services (VPLS), Ethernet over MPLS (EoMPLS), IP Security (IPsec), Dynamic Multipoint Virtual Private Network (DMVPN), CAPWAP (Control and Provisioning of Wireless Access Points), Virtual Extensible Local Area Network (VXLAN), Location/Identifier Separation Protocol (LISP), Cisco® Overlay Transport Virtualization (OTV), and Cisco® Application Centric Infrastructure (Cisco ACI™), among others.

In an overlay network, the logical topology of the overlay can be decoupled from the underlying network infrastructure. This can allow the overlay network to be designed separately from the underlay network, and to provide functions that the underlay network may itself not be able to accommodate. For example, an underlay network can be designed as a fully routed topology (e.g., routing all the way down to the Premise Wire Distribution (PWD) room or wiring closet). A fully routed topology (also sometimes known as routed access) can have some advantages, such as stability, scalability, quick re-convergence in the event of network outages, and effective traffic load balancing (e.g., via Equal Cost Multipath (ECMP), among others. However, a fully routed topology can also have certain drawbacks. For example, it may not be possible to extend a Virtual Local Area Network (VLAN) between two or more PWDs, which can limit flexibility for some applications that may require a subnet to appear in more than one place in the network. A fully routed topology may also require the generation, use, and ongoing support of a large number of subnets (e.g., one or more per PWD). In a large deployment, this can become untenable to manage and waste a large amount of Internet Protocol (IP) address space (e.g., each subnet must be sized to the maximum it might grow to in terms of the number of hosts it needs to support, which can result in wasted IP address space during deployment and use).

In some embodiments, a network can be configured to provide the benefits of an underlay transport network that is fully routed (e.g., stability, scalability, fast network reconvergence, effective traffic load-balancing, etc.) and a wider area network that offers flexible services (e.g., such as by "stretching" overlay IP subnets across wider areas, without incurring the traditional issues associated with the widescale use of Spanning Tree and large, looped L2 designs, etc.). Network devices (e.g., switches, routers, Wireless Local Area Network (WLAN) controllers, access points, network appliances, network services, etc.) can attach to the underlay network, and hosts (e.g., computing systems, computing devices, endpoints, etc.) or actual users can attach to the overlay network. This can enable the underlay network to be kept static and stable—promoting high availability and continuity—but allow users, computing devices, and services to connect to and disconnect from the network at any time via the overlay network—allowing rapid deployment and operation of new network functionality without placing the network at risk.

An enterprise or other organization can deploy multiple Local Area Networks (LANs), access networks, or sites (e.g., a data center network, campus network, branch office, or other network in which nodes (e.g., hosts, network devices, subnets, networks, etc.) (collectively, LANs) can connect directly (e.g., single hop) or indirectly (e.g., multiple hops) to one another without a transport network (e.g., an MPLS, Internet, LTE, or other WAN service provider network). A WAN platform can interconnect the LANs over one or more transport networks, and provide end-to-end network visibility, performance, security, policy enforcement, and other benefits accruing from control and management of the enterprise network (e.g., the LANs and the WAN platform) from one end to the other. For example, end-to-end network control and management can enable user identity to be established in one LAN and carry the user identity across the transport networks and into another LAN to enable holistic treatment of traffic on the basis of user identity. In some embodiments, multiple LANS and a WAN platform of an enterprise network can implement Locator/Identifier Separation Protocol (LISP) (or similar technology for separating host identifier information and host location information) to send traffic from hosts within the LANs to remote LANs of the enterprise network; the WAN platform can receive the traffic, extract the host identifier information, process the traffic according to the host identifier information, and propagate the host identifier information and the traffic over one or more transport networks to the remote LANs; and the remote LANs can in turn act on the traffic on the basis of the identity information.

LISP is a network architecture and protocol that uses multiple namespaces or network addresses for identifying and locating network nodes, such as an identity namespace or address space and a location namespace or address space. This is distinguishable from a conventional network that may only use a single namespace or address space (e.g., Internet Protocol (IP) addresses) for both identifying and locating network nodes. LISP can assign addresses in the identity namespace (e.g., Endpoint Identifier (EID) namespace) to hosts, and addresses in the location name space (e.g., Routing Locator (RLOC) namespace) to network devices. LISP can maintain a directory of identifiers and their corresponding locations (e.g., a directory mapping of the EID namespace to the RLOC namespace). LISP, as a protocol, can define the signaling to populate this directory, keep it updated, and enable network devices to consult the directory and resolve the locations of EIDs of interest. Routing and forwarding of data packets can continue to be the responsibility of traditional routing protocols in the RLOC namespace but LISP can augment these protocols by adding another namespace to enable functionality that may otherwise be difficult to achieve natively in traditional routing protocols. Because of the separation of the namespaces and their loose coupling with basic routing and forwarding, the definition of EIDs and RLOCs can extend beyond addressing to include policy semantics and other metadata to provide features such as host mobility, large-scale segmentation, traffic engineering, location-aware policies, location tracking services, and so forth. A WAN platform that can integrate LISP (or similar technology for separating host identifier information and host location information) across multiple LANs can take further advantage of the decoupling of host identity and location.

FIG. 1 illustrates an example of a WAN platform 100 for implementing aspects of the present technology. An example of an implementation of the WAN platform 100 is the Cisco® Software Defined Wide Area Network (SD-WAN) architecture. However, one of ordinary skill in the art will understand that, for the WAN platform 100 and any other system discussed in the present disclosure, there can be additional or fewer component in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure.

In this example, the WAN platform 100 can comprise an orchestration plane 102, a management plane 120, a control plane 130, and a data plane 140. The orchestration plane 102 can assist in the automatic on-boarding of WAN edge devices 142 (e.g., switches, routers, etc.) in an overlay network. The orchestration plane 102 can include one or more physical or virtual network orchestrator appliances 104A-B (collectively, 104). The network orchestrator appliances 104 can perform the initial authentication of the WAN edge devices 142 and orchestrate connectivity between the devices of the control plane 130 and the data plane 140. In some embodiments, the network orchestrator appliances 104 can also enable communication of devices located behind Network Address Translation (NAT). In some embodiments, physical or virtual Cisco® SD-WAN vBond appliances can operate as the network orchestrator appliances 104.

The management plane 120 can be responsible for central configuration and monitoring of the WAN platform 100. The management plane 120 can include one or more physical or virtual network management appliances 122. The network management appliances 122 can provide centralized management of the WAN platform 100 via a graphical user interface to enable a user to monitor, configure, and maintain the WAN edge devices 142 and links to transport networks 160 (e.g., Internet transport network 162, MPLS network 164, 4G/LTE network 166) in an underlay and overlay network. The network management appliances 122 can support multi-tenancy and enable centralized management of logically isolated networks associated with different entities (e.g., enterprises, divisions within enterprises, groups within divisions, etc.). Alternatively or in addition, the network management appliances 122 can be a dedicated network management system for a single entity. In some embodiments, physical or virtual Cisco® SD-WAN vManage appliances can operate as the network management appliances 122.

The management plane 120 can also include an analytics engine 124 for providing visibility into the performance of applications and the network over time, such as the best and worst performing applications, the most bandwidth consuming applications, anomalous applications families (e.g., applications whose bandwidth consumption change over a period of time), network availability and circuit availability, carrier health, best and worst performing tunnels, and so forth. The analytics engine 124 may include a user interface that can generate graphical representations of an overlay network and enable users to drill down to display the characteristics of a single carrier, tunnel, or application at a particular time. The user interface can serve as an interactive overview of the network and an entrance point for more details. In some embodiments, the user interface can display information for the last 24 hours and enable a user to drill down to select different time periods for different data sets to display. The user interface can also display data for network availability, WAN performance by carrier, and applications, among other network analytics.

In some embodiments, the analytics engine 124 can provide application performance with a Virtual Quality of Experience (vQoE) value, which can be customized for individual applications. This value can range from zero to ten, with zero being the worst performance and ten being the best. The analytics engine can calculate vQoE based on latency, loss, and jitter, and customize the calculation for each application.

The analytics engine 124 can offer insight into planning the WAN and into its operational aspects, from historical performance, to forecasting, to providing recommendations for optimizing the WAN. The analytics engine 124 can store months of data, apply machine learning algorithms, and provide unique insights and recommendations. For example, the analytics engine 124 can offer forecasting recommendations to plan for sites that may need additional bandwidth in the next three to six months; what-if scenarios to help identify opportunities for balancing cost, performance, and availability of networks and applications; application-aware routing policies based on historical information to fine tune the WAN; recommended network service providers for a specific location; and so forth.

The control plane 130 can build and maintain a topology for the WAN 100 and make decisions on where traffic flows across the transport networks 160. The control plane 130 can include one or more physical or virtual network controller appliances 132A-C (collectively, 132). The network controller appliances 132 can establish secure connections to each WAN edge device 142 and distribute route and policy information via a control plane protocol (e.g., Overlay Management Protocol (OMP) (discussed in further detail below), Open Shortest Path First (OSPF), Intermediate System to Intermediate System (IS-IS), Border Gateway Protocol (BGP), Protocol-Independent Multicast (PIM), Internet Group Management Protocol (IGMP), Internet Control Message Protocol (ICMP), Address Resolution Protocol (ARP), Bidirectional Forwarding Detection (BFD), Link Aggregation Control Protocol (LACP), etc.). In some embodiments, the network controller appliances 132 can operate as route reflectors. The network controller appliances 132 can also orchestrate secure connectivity in the data plane 140 between and among the WAN edge devices 142. For example, in some embodiments, the network controller appliances 132 can distribute crypto key information among the WAN edge devices 142. This can allow the network to support a secure network protocol or application (e.g., IPSec, Transport Layer Security (TLS), Secure Shell (SSH), etc.) without Internet Key Exchange (IKE) and enable scalability of the network. In some embodiments, physical or virtual Cisco® SD-WAN vSmart controllers can operate as the network controller appliances 132.

The data plane 140 can be responsible for forwarding packets based on decisions from the control plane 130. The data plane 140 can include the WAN edge devices 142, which can be physical or virtual network devices. The WAN edge devices 142 can operate within various sites (e.g., access networks, LANs, or other networks in which nodes can connect to one another without the transport networks 160) associated with an organization, such as in one or more data centers 150, campus networks 152, branch offices 154, home offices 156, and other sites 158 (e.g., stores, electronic kiosks, connected cars, etc.), or in the cloud (e.g., Infrastructure as a Service (IaaS), Platform as a Service (PaaS), SaaS, and other cloud service provider networks). The WAN edge devices 142 can provide secure data plane connectivity among the LANs or the cloud over one or more transport networks, such as via one or more Internet transport networks 162 (e.g., Digital Subscriber Line (DSL), cable, etc.), MPLS networks 164 (or other private packet-switched network (e.g., Metro Ethernet, Frame Relay, Asynchronous Transfer Mode (ATM), etc.), mobile networks 166 (e.g., 3G, 4G/LTE, 5G, etc.), or other WAN technologies (e.g., Synchronous Optical Networking (SONET), Synchronous Digital Hierarchy (SDH), Dense Wavelength Division Multiplexing (DWDM), or other fiber-optic technology; leased lines (e.g., T1/E1, T3/E3, etc.); Public Switched Telephone Network (PSTN), Integrated Services Digital Network (ISDN), or other private circuit-switched network; small aperture terminal (VSAT) or other satellite network; etc.). The WAN edge devices 142 can be responsible for traffic forwarding, security, encryption, quality of service (QoS), and routing (e.g., BGP, OSPF, etc.), among other tasks. In some embodiments, physical or virtual Cisco® SD-WAN vEdge routers can operate as the WAN edge devices 142.

Figure 2:
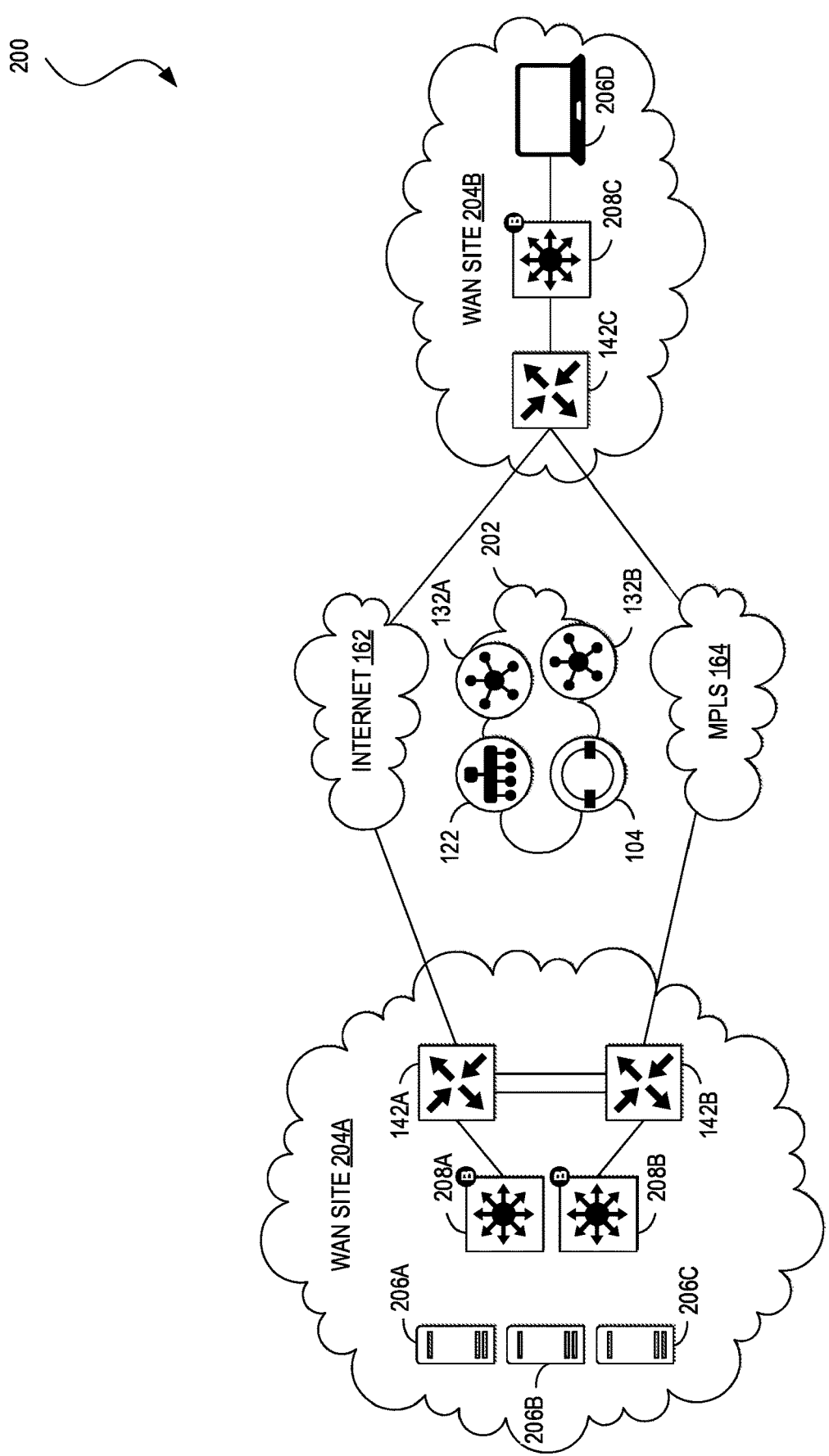
FIG. 2 illustrates an example of a network environment for showing how to deploy the WAN platform of FIG. 1 in accordance with an embodiment.

FIG. 2 illustrates an example of a network environment 200 for showing how to deploy the WAN platform 100. The network environment 200 can include a WAN management network 202, a pair of WAN sites 204A and 204B (collectively, 204) (e.g., the data centers 150, the campus networks 152, the branch offices 154, the home offices 156, the other sites 158, cloud service provider networks, etc.), and a pair of transport networks 160 (e.g., the Internet transport network 162 and MPLS network 164). As used herein, a site can refer to a part of an overlay network or fabric including at least one network device under administrative control of a network controller for the overlay network. In this example, the WAN sites 204 include the WAN edge devices 142, and the WAN edge devices 142 can form a part of an overlay network created by the WAN network controller appliances 132.

The WAN management network 202 can be a physical or virtual network in which certain components of the WAN 100 platform can reside, such as the network orchestrator appliance 104, the network management appliance 122, and the network controller appliances 132A and 132B. Although the WAN management network 202 is shown as a single network in this example, one of ordinary skill in the art will understand that each component of the WAN management network 202 can be distributed across any number of networks and/or be co-located with the sites 204. Each component of the WAN management network 202 can be reached through any transport network (e.g., the Internet transport network 162 or the MPLS network 164).

Each WAN site 204 can include one or more hosts 206A-206D (collectively, 206) (sometimes also referred to as endpoints, computing devices, computing systems, etc.) connected to one or more border devices 208-208C (collectively, 208), which can in turn connect to the WAN edge devices 142A-C, respectively. The hosts 206 can include general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), ear devices, etc.), and so forth. The hosts 206 can also include Internet of Things (IoT) devices or equipment, such as agricultural equipment (e.g., livestock tracking and management systems, watering devices, unmanned aerial vehicles (UAVs), etc.); connected cars and other vehicles; smart home sensors and devices (e.g., alarm systems, security cameras, lighting, appliances, media players, HVAC equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

The border devices 208 can include physical or virtual switches, routers, and other network devices. Although the site 204A is shown including a pair of border devices 208A and 208B and a pair of WAN edge devices 142A and 142B, and the site 204B is shown including a single border device 208 and a single WAN edge device 142 in this example, the sites 204 can comprise any number of network devices in any network environment, including multi-tier (e.g., core, distribution or aggregation, and access tiers), spine-and-leaf, mesh, tree, bus, hub and spoke, and so forth. For example, in some embodiments, one or more data centers may implement the Cisco ACI™ platform and/or one or more campus networks or branch offices may implement the Cisco® Software Defined Access (SD-Access or SDA) platform.

Thus, the WAN sites 204 can be sites of a data center fabric via the border devices 208, sites of an access network fabric via the border devices 208, a campus network that is part of an access network fabric via the border devices 208A and 208B and a branch office that is part of the access network fabric via the border device 208C, a campus network that is part of an access network via the border devices 208 and 208B and a data center that is a part of a data center fabric via the border device 208C, and so on. In this example, the border devices 208 can operate as WAN aggregation devices to directly connect (e.g., via a single hop) or indirectly connect (e.g., via multiple hops) nodes of the WAN sites 204, such as the hosts 206 and other network devices (not shown), to the WAN edge devices 142, and the WAN edge devices 142 can connect the WAN sites 204 to the Internet transport network 162 or the MPLS network 164 and to each other over the transport networks.

In some embodiments, "color" can be used to identify or distinguish an individual transport network (e.g., no same color may be used twice on a single WAN edge device 142), and different transport networks may be assigned different colors (e.g., mpls, private1, biz-internet, metro-ethernet, lte, etc.). In this example, the network environment 200 can utilize a color called "public-internet" for the Internet transport network 162 and a color called "mpls" or "biz-internet" for the MPLS network 164. In other embodiments, colors by themselves can also have significance. For example, the colors metro-ethernet, mpls, and private1, private2, private3, private4, private5, and private6 may be considered private colors, which can be used for private networks or in places where there is no NAT addressing of hosts (e.g., because there may be no NAT between two hosts of the same color). When the WAN edge devices 142 use a private color, they may attempt to build IPSec tunnels to other edge devices using native, private, underlay IP addresses. The public colors can include 3 g, biz, internet, blue, bronze, custom1, custom2, custom3, default, gold, green, lte, public-internet, red, and silver. The public colors may be used by the WAN edge devices 142 to build tunnels to post-NAT IP addresses (if there is NAT involved). If the WAN edge devices 142 use private colors and need NAT to communicate to other private colors, the carrier setting in the configuration can dictate whether the WAN edge devices 142 use private or public IP addresses. Using this setting, two private colors can establish a session when one or both are using NAT.

Figure 3:
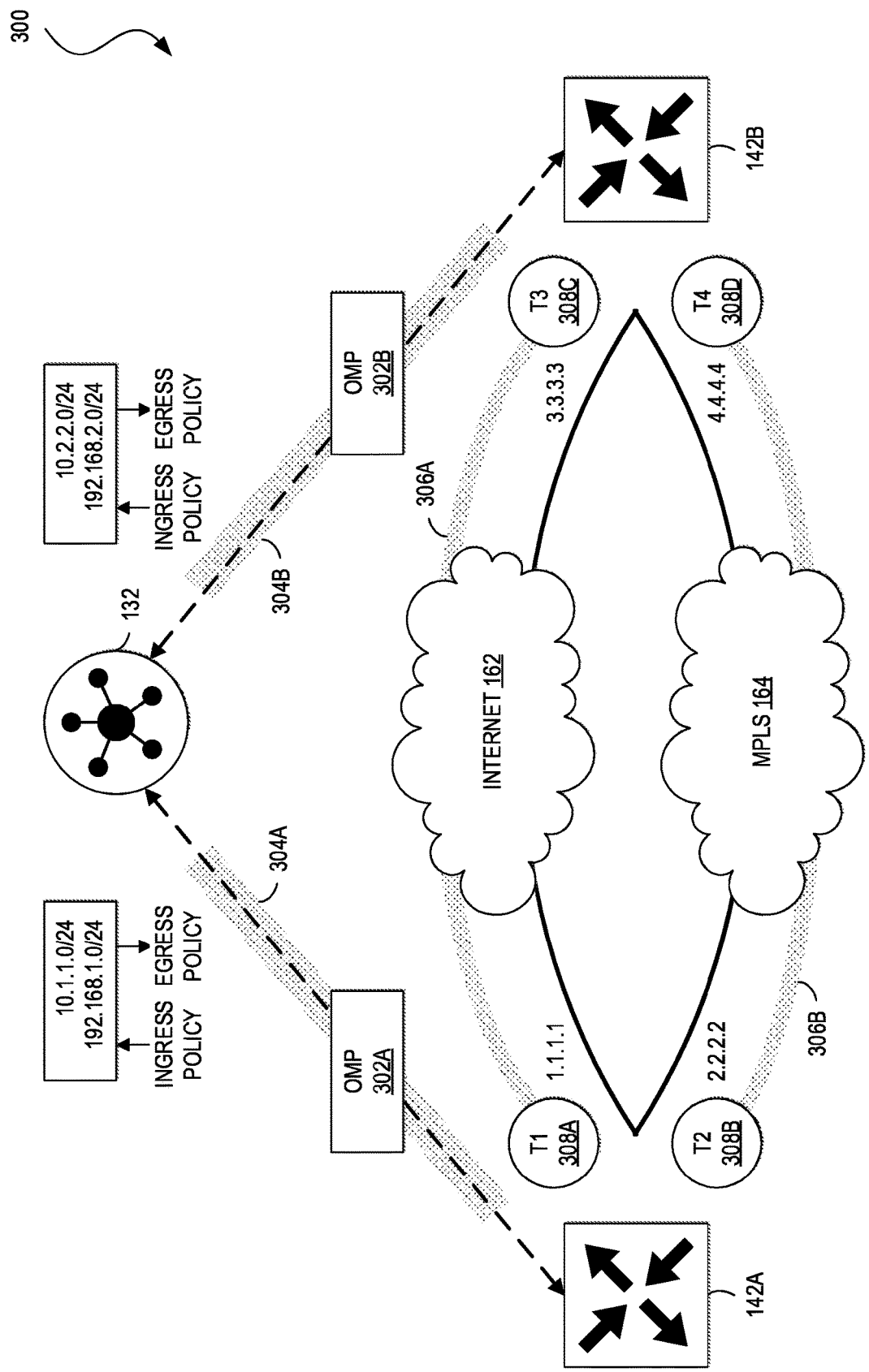
FIG. 3 illustrates an example of a network environment for showing how to manage an overlay network in accordance with an embodiment.

FIG. 3 illustrates an example of a network environment 300 for showing how to manage an overlay network, such as a WAN overlay network of the WAN platform 100, via OMP. In this example, OMP messages 302A and 302B (collectively, 302) may be transmitted back and forth between the network controller appliance 132 and the WAN edge devices 142A and 142B, respectively, where control plane information, such as route prefixes, next-hop routes, crypto keys, policy information, and so forth, can be exchanged over respective secure DTLS or TLS connections 304A and 304B. The network controller appliance 132 can operate similarly to a route reflector. For example, the network controller appliance 132 can receive routes from the WAN edge devices 142, process and apply policies to them, and advertise routes to other WAN edge devices 142 in the overlay network. If there is no policy defined, the WAN edge devices 142 may behave in a manner similar to a full mesh topology, where each WAN edge device 142 can connect directly to another WAN edge device 142 at another WAN site and receive full routing information from each site.

OMP can advertise three types of routes:

OMP routes, which can correspond to prefixes that are learned from the local network (e.g., local relative to the WAN edge device 142), or service side, of the WAN edge device 142. The prefixes can be originated as static or connected routes, or from within a routing protocol (e.g., BGP, OSPF, etc.), and redistributed into OMP so they can be carried across the overlay. OMP routes can advertise attributes such as TLOC information (which can similar to a BGP next-hop IP address) and other attributes such as origin, originator, preference, site identifier, tag, and VPN identifier. An OMP route may be installed in the forwarding table if the TLOC to which it points is active.

TLOC routes, which can correspond to logical tunnel endpoint on the WAN edge devices 142 that connect into the Internet transport network 162 or the MPLS network 164. In some embodiments, a TLOC route can be uniquely identified and represented by a three-tuple, including an IP address, link color, and encapsulation (e.g., GRE, IPSec, etc.). In addition to system IP address, color, and encapsulation, TLOC routes can also carry attributes such as TLOC private and public IP addresses, carrier, preference, site identifier, tag, and weight. In some embodiments, a TLOC may be in an active state on a particular WAN edge device 142 when an active BFD session is associated with that TLOC.

Service routes, which can represent services (e.g., firewall, distributed denial of service (DDoS) mitigator, load balancer, Intrusion Prevent System (IPS), Intrusion Detection Systems (IDS), WAN optimizer, etc.) that may be connected to the local networks (e.g., the data center 150, the campus network 152, the branch office 154, etc.) of the WAN edge devices 142 and accessible to other WAN sites for use with service insertion. In addition, these routes can also include VPNs; the VPN labels can be sent in an update to notify the network controller appliance 132 what VPNs are serviced at a remote WAN site.

In the example of FIG. 3, OMP is shown running over the DTLS/TLS tunnels 304 established between the WAN edge devices 142 and the network controller appliance 132. In addition, the block diagram 300 shows an IPSec tunnel 306A established between TLOC 308A and 308C over the Internet transport network 162 and an IPSec tunnel 306B established between TLOC 308B and TLOC 308D over the MPLS network 164. Once the IPSec tunnels 306A and 306B are established, BFD can be enabled across each of them.

In some embodiments, network-wide segmentation can be implemented by defining virtual network groupings (e.g., VLANs, VNIDs, VRFs, VPNs, EPGs, etc.) at the edges of the WAN platform 100 (e.g., the WAN edge devices 142), and carrying segmentation information in the packets for intermediate nodes to handle. For example, the WAN edge device 142A can subscribe to two VPNs, a "red" VPN corresponding to the prefix 10.1.1.0/24 (e.g., either directly through a connected interface or learned via Internal Gateway Protocol (IGP) or Border Gateway Protocol (BGP)), and a "blue" VPN corresponding to the prefix 10.2.2.0/24. The WAN edge device 142B can likewise subscribe to two VPNs, the red VPN, corresponding to the prefix 192.168.1.0/24, and the blue VPN, corresponding to the prefix 192.168.2.0/24 (either directly through a connected interface or learned via IGP or BGP).

Because the WAN edge devices 142 have OMP connections over the DTLS/TLS tunnels 304 to the network controller appliance 132, they can propagate their routing information to the network controller appliance 132. On the network controller appliance 132, a network administrator can enforce policies to drop routes, to change TLOCs (which can be overlay next hops) for traffic engineering or service chaining, or to change the VPN identifier. The network administrator can apply these policies as inbound or outbound policies on the network controller appliance 132.

Prefixes belonging to a single VPN can be kept in a separate route table. This can provide L3 isolation for the various segments in the network. Thus, the WAN edge devices 142 can each have two VPN route tables. In addition, the network controller appliance 132 can maintain the VPN context of each prefix. Separate route tables can provide isolation on a single node. In some embodiments, VPN identifiers can be used to propagate routing information across the network. A VPN identifier carried in a packet can identify each VPN on a link. When a VPN is configured on a particular edge device, the VPN can have a link color or label associated with it. The edge device can send the link color or label, along with the VPN identifier, to the network controller appliance 132. The network controller appliance 132 can propagate information mapping the edge device to the VPN identifier to other edge devices in the network. Remote edge devices can then use the link color or label to send traffic to the appropriate VPN. Local edge devices, on receiving the data with the VPN identifier link color or label, can use the link color or label to demultiplex the data traffic. In this example, the transport networks that connect the WAN edge devices 142 can be unaware of the VPNs, the WAN edge devices 142 may know about VPNs, and the rest of the network can follow standard routing.

In some embodiments, policy can be used to influence the flow of traffic among the WAN edge devices 142. Policy can be characterized as centralized or local. Centralized policy can be provisioned on the network controller appliance 132, and localized policy can be provisioned on the WAN edge devices 142, which may sit at the network edge between WAN sites and a transport network, such as the Internet transport network 162, MPLS network 164, 4G/LTE network 166, and so forth.

Policy can also be characterized as control or routing policy, which may affect the flow of routing information in the network's control plane, or data policy, which may affect the flow of data traffic in the network's data plane. Centralized control policy can apply to the network-wide routing of traffic by affecting the information that is stored in the master route table of the network controller appliance 132 and that is advertised to the WAN edge devices 142. The effects of centralized control policy can be seen in how the WAN edge devices 142 direct traffic to its destination. The centralized control policy configuration itself can remain on the network controller appliance 132 and not be pushed to the WAN edge devices 142.

When no centralized control policy is provisioned, all OMP routes can be placed in the master route table of the network controller appliance 132, and the network controller appliance 132 can advertise all OMP routes to all of the WAN edge devices 142 in the same virtual network segment (e.g., VLAN, VNID, VRF, VPN, EPG, or other collection of hosts). By provisioning centralized control policy, an administrator or other user can affect which OMP routes are placed in the master route table of the network controller appliance 132, what route information is advertised to the WAN edge devices 142, and whether the OMP routes are modified before being put into the master route table or before being advertised.

When centralized control policy is provisioned, the network controller appliance 132 can redistribute route information to the WAN edge devices 142 or modify the route information that is stored in the master route table of the network controller appliance 132 or that is advertised by the network controller appliance 132. The network controller appliance 132 can activate the control policy by applying it to specific sites in the WAN in either the inbound or the outbound direction (with respect to the network controller appliance 132). Applying a centralized control policy in the inbound direction can filter or modify the routes being advertised by the WAN edge devices 142 before they are placed in the master route table on the network controller appliance 132. As the first step in the process, routes can be accepted or rejected. Accepted routes can be installed in the master route table on the network controller appliance 132 either as received or as modified by the control policy. Routes that are rejected by a control policy can be silently discarded.

Applying a control policy in the outbound direction can filter or modify the routes that the network controller appliance 132 redistributes to the WAN edge devices 142. As the first step of an outbound policy, routes can either be accepted or rejected. For accepted routes, centralized control policy can modify the routes before they are distributed by the network controller appliance 132. Routes that are rejected by an outbound policy are not advertised.

The WAN edge devices 142 can place route information learned from the network controller appliance 132 into their local route tables for use when forwarding data traffic. Because the network controller appliance 132 can operate as the centralized routing system in the network, the WAN edge devices 142 do not modify the OMP route information that they learn from the network controller appliance 132. The network controller appliance 132 can regularly receive OMP route advertisements from the WAN edge devices 142 and, after recalculating and updating the routing paths through the network, the network controller appliance 132 can advertise new routing information to the WAN edge devices 142.

The centralized control policy provisioned on the network controller appliance 132 can remain on the network controller appliance and not be downloaded to the WAN edge devices 142. However, the routing decisions that result from centralized control policy can be passed to the WAN edge devices 142 in the form of route advertisements, and so the effect of the control policy can be reflected in how the WAN edge devices 142 direct data traffic to its destination.

Localized control policy can be provisioned locally on the WAN edge devices 142. Localized control policy can be similar to the routing policies configured on a conventional router, such as how BGP and OSPF routing (or other routing protocol) behavior can be modified within a local network. Localized data policy can allow for provisioning and application of access lists to a specific interface or interfaces on the WAN edge devices 142. Simple access lists can permit and restrict access based on a 6-tuple match (e.g., source and destination IP addresses and ports, DSCP fields, and protocol), in the same way as with centralized data policy. Access lists can also allow provisioning of class of service (CoS), policing, and mirroring, which can control how data traffic flows out of and in to the interfaces and interface queues of the WAN edge devices 142.

Centralized data policy can apply to the flow of data traffic throughout the network. When no centralized data policy is provisioned, all prefixes within a particular network segment (e.g., VLAN, VNID, VRF, VPN, EPG, or other network segment technology) may be reachable from that segment. Provisioning centralized data policy can apply a 6-tuple filter that controls access between sources and destinations. As with centralized control policy, centralized data policy can be provisioned on the network controller appliance 132, and that configuration can remain on the network controller appliance 132. The effects of data policy can be reflected in how the WAN edge devices 142 direct data traffic to its destination. Unlike control policy, however, centralized data policies may be pushed to the WAN edge devices 142 in a read-only fashion.

In some embodiments, centralized data policies can be configured on the network controller appliance 132 using lists, policy definition (or policies), and policy application. Lists can define the targets of policy application or matching. Some examples of lists can include prefix lists (e.g., list of prefixes for use with policies), site lists (e.g., list of site identifiers for use in policy definitions and policy applications), TLOC lists (e.g., lists of TLOCs for use in policy definitions), and VPN lists (e.g., list of VPNs for use in policy) or lists of other network segments (e.g., VLANs, VNIDs, VRFs, EPGs, or other network segmentation technology). Policy definition (or policies) can control aspects of control and forwarding. Policy definition (or policies) can include different types of policies, such as control policies, data policies, and ZFW policies (e.g., policies defining zones and controlling traffic between zones). Policy application can control what a policy is applied towards. Policy application can be site-oriented, and can be defined by the site-list.

Figure 4:
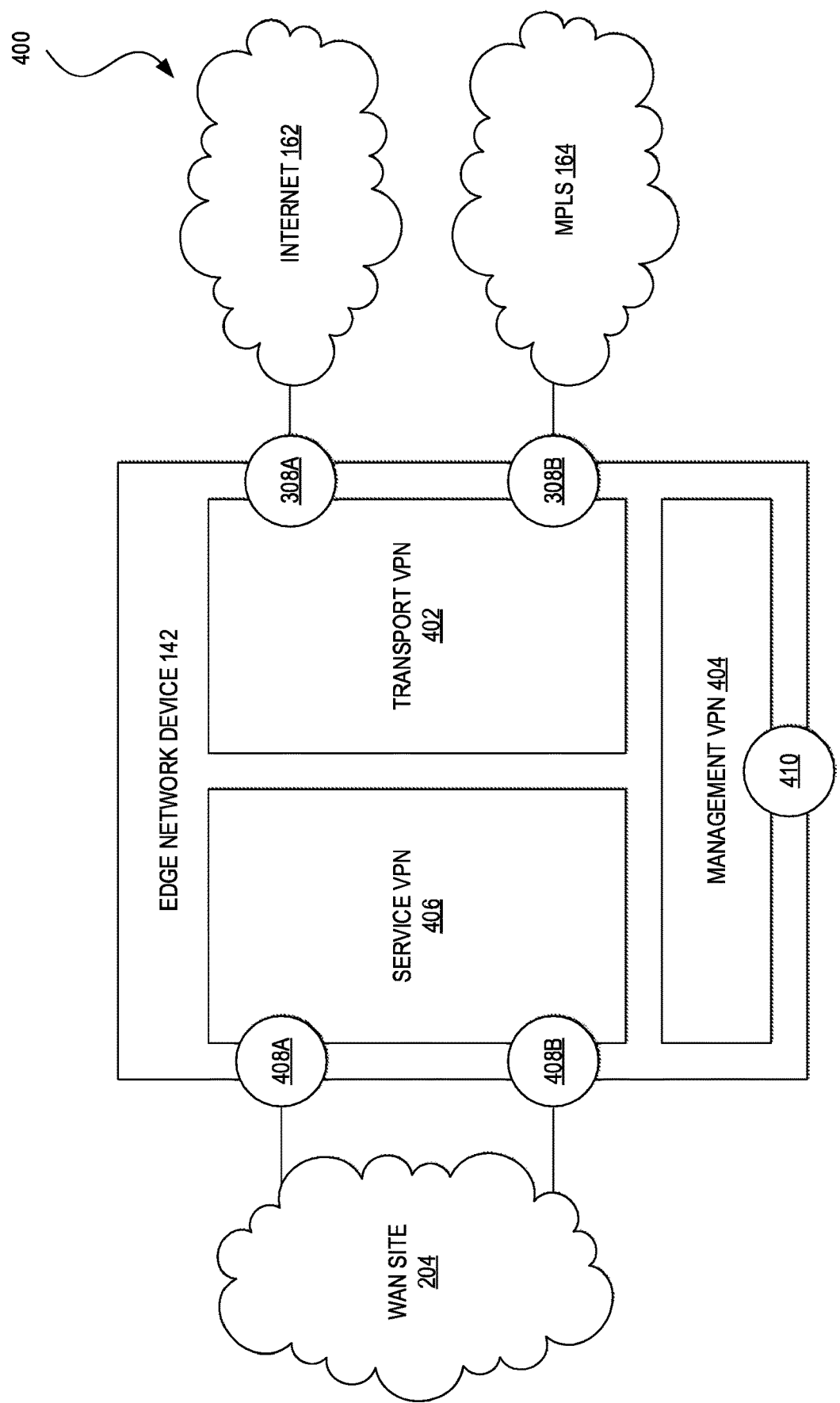
FIG. 4 illustrates an example of a network environment for showing how the WAN platform 100 can segment a network in accordance with an embodiment.

FIG. 4 illustrates an example of a network environment 400 for showing how the WAN platform 100 can segment a network using VPNs. VPNs can be isolated from one another and can have their own forwarding tables. An interface or sub-interface can be explicitly configured under a single VPN and may not be part of more than one VPN. Labels may be used in OMP route attributes and in the packet encapsulation, which can identify the VPN to which a packet belongs. The VPN number can be a four-byte integer with a value from 0 to 65530. In some embodiments, each WAN edge device 142 can include a transport VPN 402 (e.g., VPN number zero) and a management VPN 404 (e.g., VPN number five-hundred twelve). The transport VPN 402 can include one or more physical or virtual network interfaces (e.g., Gigabit Ethernet network interfaces corresponding to the TLOCs 308A and 308B) that respectively connect to transport networks (e.g., the Internet transport network 162 and the MPLS network 164). Secure DTLS/TLS connections to the network controller appliances 132 or between the network controller appliances 132 and the network orchestrator appliances 104 can be initiated from the transport VPN 402. In addition, static or default routes or a dynamic routing protocol can be configured inside the transport VPN 402 to get appropriate next-hop information so that the control plane 130 may be established and IPSec tunnels 306 (not shown) can connect to remote WAN sites.

The management VPN 404 can carry out-of-band management traffic to and from the network orchestrator appliances 104, network management appliances 122, network controller appliances 132, and/or WAN edge devices 142 over a management network interface 412. In some embodiments, the management VPN 404 may not be carried across the overlay network.

In addition to the transport VPN 402 and the management VPN 404, each WAN edge device 142 can also include one or more service VPNs 406. The service VPN 406 can include one or more physical or virtual network interfaces (e.g., Gigabit Ethernet network interfaces 408A and 408B) that connect to one or more WAN sites 204 (e.g., the data center 150, the campus network 152, the branch office 154, etc.) and carry data traffic. The service VPN 406 can be configured to provide features such as OSPF or BGP, Virtual Router Redundancy Protocol (VRRP), QoS, traffic shaping, policing, and so forth. In some embodiments, data traffic can be directed over IPSec tunnels to other WAN sites by redistributing OMP routes received from the network controller appliances 132 at the WAN site 204 into the routing protocol configured for the service VPN 406. In turn, routes from the WAN site 204 can be advertised to other sites of the WAN platform 100 by advertising the service VPN routes into the OMP routing protocol, which can be sent to the network controller appliances 132 and be redistributed to other WAN edge devices 142 in the WAN platform 100.

Figure 5A:
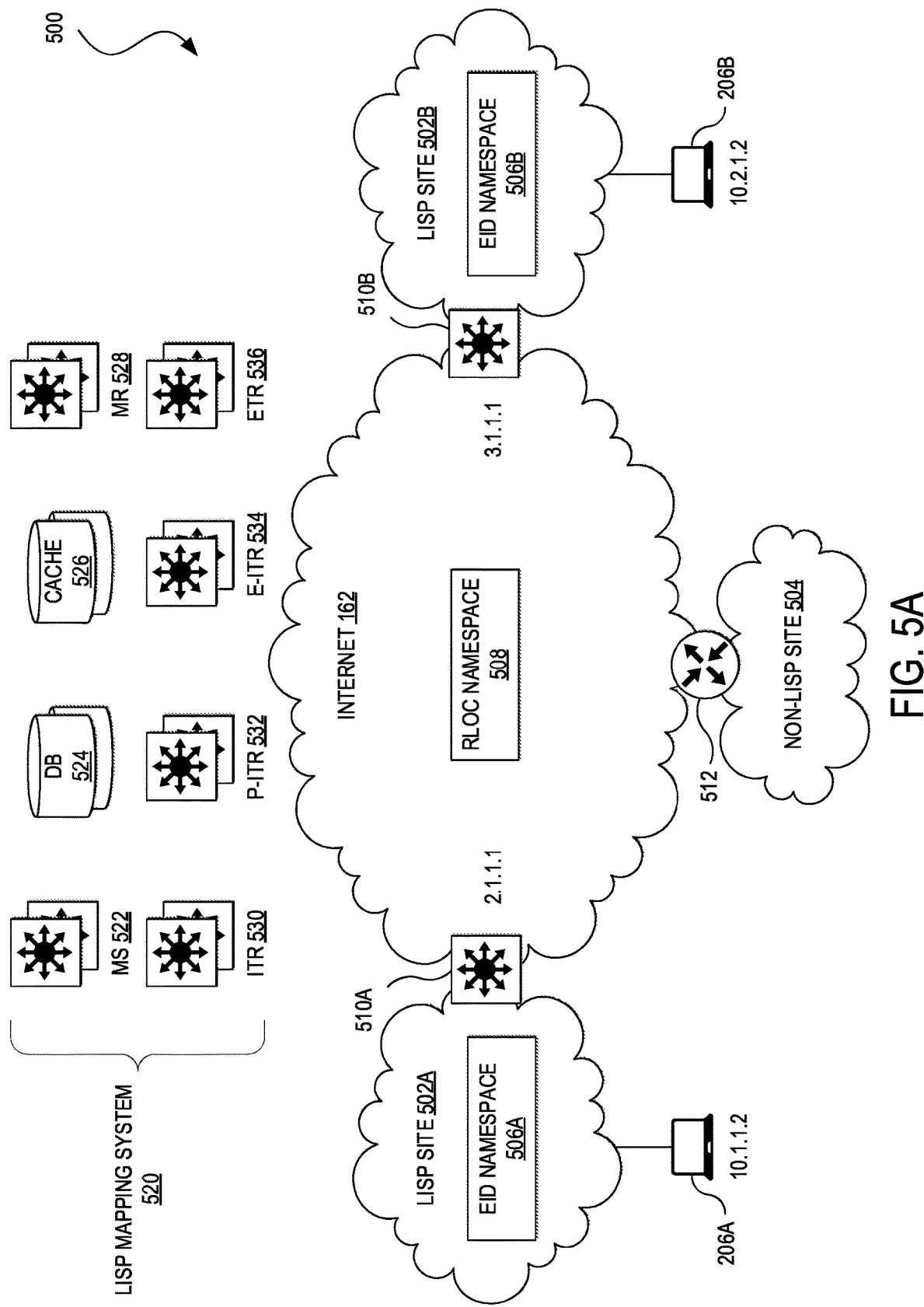
FIGS. 5A and 5B illustrate examples of network environment for showing how to deploy Locator/Identifier Separation Protocol (LISP) in accordance with some embodiments.

FIG. 5A illustrates a block diagram of an example of a network environment 500 for showing certain aspects of a LISP mapping system 520. Although LISP is used in this example for simplicity and conciseness, other embodiments may utilize other technologies for separating host identifier information and host location information. One of ordinary skill in the art will understand how to apply the principles disclosed in the various embodiments discussed herein to incorporate the other technologies without departing from the scope of the present disclosure. In this example, the network environment 500 can include one or more transport networks (e.g., the Internet 162), LISP sites 502A and 502B (collectively, 502), a non-LISP site 504, and a LISP mapping system 520. LISP is a network architecture and protocol that uses multiple namespaces for identifying and locating network nodes—an identity namespace and a location namespace. In general, the LISP mapping system 520 can maintain information on hosts 206 attached to the LISP sites 502 at all times, such as the hosts' IP addresses, Media Access Control (MAC) addresses, virtual network information (e.g., VLAN, VNID, VRF, VPN, EPG, etc.), user or group information (e.g., Security Group Tags (SGTs)), and other information, in addition to the hosts' location (i.e., which of the LISP devices 510A or 510B (collectively, 510) the hosts 206 are located behind).

The LISP mapping system 520 is a logical representation of the components of a LISP deployment, and can include one or more mapping servers 522 (e.g., LISP Map-Servers), mapping databases 524 (sometimes also referred to as a Host Tracking Database (HTDB)), mapping caches 526, mapping resolvers 528 (e.g., LISP Map-Resolvers), Ingress Tunnel Routers (ITRs) 530, Proxy Ingress Tunnel Routers 532 (P-ITRs), Proxy Egress Tunnel Routers (P-ETRs) 534, and Egress Tunnel Routers (ETRs) 536. The components of the LISP mapping system 520 can each be separate physical or virtual devices, can be incorporated within a single LISP device 510, or can be incorporated in multiple LISP devices 510. For example, a first network can include a discrete mapping server 522 that incorporates a mapping database 524, a discrete mapping resolver 528 that incorporates a mapping cache 526, a discrete ITR 530, a discrete P-ITR 532, a discrete E-ITR 534, and a discrete ETR 536, and a second network can include one LISP device 510 that can perform the operations of the mapping server 522, the mapping database 524, the mapping cache 526, the mapping resolver 528, the ITR 530, the P-ITR 532, the E-ITR 534, and the ETR 536.

In general, the LISP mapping system 520 can map the hosts 206 by first network addresses representing identifiers for the hosts (e.g., EIDs), and second network addresses representing locators for the hosts (e.g., RLOCs or the network addresses of the network devices to which the hosts are connected). The LISP sites 502A (and the LISP device 510A) and 502B (and the LISP device 510B) can maintain EID namespaces 506A and 506B (collectively, 506), respectively, while the non-LISP site 504 would not have such information. However, the LISP mapping system 520 can track conventional network address information for hosts in the non-LISP site 504 via RLOC namespace 508. As the hosts 206 connect to the LISP sites 502, the LISP devices 510 to which the hosts attach can populate information about the hosts into the LISP mapping system 520. Other LISP devices that have traffic to deliver to the hosts 206 can query the LISP mapping system 520 to determine which RLOCs or LISP devices 510 the hosts are located behind. In this manner, the LISP mapping system 520 can operate as a single source of truth at all times about the locations of the hosts 206 within the network environment 500.

The LISP devices 510 can function as tunnel routers at the edges of the network environment 500. The LISP devices 510 can perform the encapsulation and de-encapsulation of LISP traffic into RLOC addressed tunnels. The LISP devices 510 can also populate and query the LISP mapping system 520. Depending on the direction of traffic, the LISP devices 510 may perform the role of the ITRs 530 or the ETRs 536 (e.g., where ingress and egress are relative to the LISP overlay network or the Internet 162 in this example). When the LISP devices 510 function as both the ITRs 530 and the ETRs 536, they may be referred to as Transceiving Tunnel Routers (xTRs).

When the host 206A sends traffic over to the host 206B, the LISP device 510A can perform the role of the ITR 530 and the LISP device 510B can perform the role of the ETR 532. When configured as the ITR 530, the LISP device 510A can operate as an entry point of traffic from the hosts 206 (e.g., the host 206A) within the LISP site 502A over the Internet 162 to hosts (e.g., the host 206B) in other LISP sites (e.g., the LISP site 502B). The LISP device 510A, as the ITR 530, can query the LISP mapping system 520 to obtain locator mappings for EIDs of the hosts in the other LISP sites receiving the traffic. The LISP device 510A, as the ITR 530, can use LISP messages, known as Map-Requests, to issue such queries. The LISP device 510A, as the ITR 530, can also cache the mappings received from the LISP mapping system 520 within the ITR's mapping cache 526. Caching can improve scalability and computing resource utilization (e.g., Central Processing Unit (CPU), memory, network bandwidth, etc.) of the LISP mapping system 520. In addition, the LISP device 510A, as the ITR 530, can encapsulate traffic to the destination location. For example, the LISP device 510A, as the ITR 530, can select an RLOC from the mapping for the destination EID, and encapsulate the traffic in a tunnel using the selected RLOC as the tunnel destination address. The LISP device 510A, as the ITR 530, can verify the viability of the RLOC in various ways but, for example, the LISP device 510A can check that candidate RLOCs are reachable and available, and then calculate a hash on the EID traffic header, including the priority and weight values included for each RLOC as part of the mapping received from the LISP mapping system 520.

When configured as the ETR 536, the LISP device 510B can operate as an exit point of traffic from hosts (e.g., the host 206A) from other LISP sites (e.g., the LISP site 502A) over the Internet 162 to the hosts (e.g., the host 206B) in its site (e.g., the LISP site 502B). The LISP device 510B, as the ETR 536, can de-encapsulate the traffic it receives. The EID to RLOC mappings, along with their priorities and weights, can be defined and kept by the LISP device 510B, operating as the ETR 536, within its mapping database (e.g., the mapping database 524). In addition, the LISP device 510B, as the ETR 536, can register these mappings with the LISP mapping system 520. The LISP device 510B, as the ETR 536, can use LISP messages, known as Map-Registers, to register as authoritative for the mappings of the EIDs local to its site (e.g., the LISP site 502A). When registered as an authoritative ETR 536 for an EID, the LISP device 510B can reply to queries about the EID mappings it has registered. In this case, the LISP device 510B can be considered as a part of the LISP mapping system 520 because it can reply to LISP resolution queries, known as Map-Requests, with responses, known as Map-Replies for its EIDs. In this mode, the LISP mapping system 520 can route Map-Requests to the LISP device 510B, and the LISP device 510B to can issue a Map-Reply directly to the ITR 530 (e.g., the LISP device 510A) that initiated the Map-Request.

When the LISP devices 510 connects to non-LISP sites (e.g., the non-LISP site 504), the LISP devices 510 can connect non-EID prefixes to prefixes in the EID namespace 506 because the non-ED prefixes (or prefixes not registered in LISP) are part of the RLOC namespace 508. This can provide for interoperability between the LISP sites 502 and the non-LISP site 504. The LISP devices 510 operating in this mode can be referred to as a Proxy Tunnel Routers (PTRs), and can operate differently depending on whether it serves ingress or egress traffic.

When the non-LISP site 504 sends traffic to the host 206B via the LISP device 510A as a LISP proxy (e.g., receiving traffic from the non-LISP site 504 on behalf of the host 206B behind the LISP device 510B), the LISP device 510A can be configured to proxy the ingress LISP traffic and the LISP device 510A can perform the role of the P-ITR 532 to receive traffic destined for LISP EIDs (e.g., the host 206B) from non-LISP sites (e.g., the non-LISP site 504). Upon receipt of the traffic, the P-ITR 532, can behave similarly as the ITR 530 and resolve the mapping for the destination EID and encapsulate the traffic toward the right location. The P-ITR 532 can request mappings and encapsulate traffic toward an EID regardless of whether the source of the traffic is an EID or not. The difference between the LISP device 510A functioning as the ITR 530 versus the P-ITR 532 is that when the LISP device 510A operates as the ITR 530, the LISP device 510A may first check whether the source is registered by the LISP mapping system 520 as an EID before performing other actions. If the source does not have an EID, the LISP device 510A, as the ITR 530, does not handle the traffic as LISP traffic, and can forward this traffic according to a route to the destination in its underlying routing tables. In other words, if the source is only associated with the RLOC namespace 508, the LISP device 510A, as the ITR 530, can assume the destination is also an RLOC and handle the traffic as such in the underlying routing. The LISP device 510A, as the P-ITR 532, does not check on the source because the P-ITR's role is to receive traffic from RLOC sources and forward it to EID destinations. When a source is in the RLOC namespace 508, the LISP device 510A, as the P-ITR 532, may simply request for mapping information, encapsulate the traffic, and forward the LISP-encapsulated traffic.

In some embodiments, the LISP device 510A, as the P-ITR 532, can attract traffic to itself if unable to forward traffic to EID destinations. For example, the P-ITR 532 can advertise to the non-LISP site 504 any EID prefixes that the P-ITR 532 may be able to service. Thus, the P-ITR 532 can operate as a honeypot router for the EIDS which are not connected to the fabric or the P-ITR 532 for any traffic destined to the EIDs it can reach as discussed further below with respect to FIGS. 6 and 7 and elsewhere in the present disclosure. Another possibility can be to use Network Address Translation (NAT) at the LISP device 510A to translate EID addresses to non-ED addresses that can be reached in the Internet's non-EID routing. This approach can avoid advertising EIDs into routing protocols and keep the LISP mapping system 520 independent from any interactions with routing. This approach can also keep EIDs from being included in underlay routing.

When the host 206B receives traffic from the non-LISP site 504 with the LISP device 510A functioning as the P-ITR 532, the LISP device 510B can be configured to proxy egress LISP traffic, and the LISP device 510B can perform the role of the P-ETR 534 for providing symmetrical encapsulation of traffic between hosts associated only with the RLOC namespace 508 and hosts associated with the EID namespace 506 as the traffic traverses the Internet 162. Similar to the ETR 536, the P-ETR 534 can de-encapsulate traffic tunneled to its RLOCs. However, the P-ETR 534 is not authoritative for any EIDs because its role is to provide connectivity for EID sources to reach destinations in the RLOC namespace 508 outside the LISP sites 502. Therefore, the P-ETR 534 does not register any addresses with the LISP mapping system 520. For example, if the ITR 532 (e.g., the LISP device 510A) requests a mapping for a particular destination but the destination is not registered in the LISP mapping system 520 (e.g., a non-LISP prefix), the LISP mapping system 520 can send a Negative Map-Reply message to the ITR 532 indicating that the destination is not registered. In addition, the LISP mapping system 520 can calculate the shortest prefix that covers the requested destination but that does not cover any LISP EIDs. The calculated non-LISP prefix can be included in the Negative Map-Reply issued to the ITR 532 so that the ITR 532 can include an entry for the non-LISP prefix in its mapping cache 526. The ITR 532 can send traffic that matches that non-LISP prefix to the P-ETR 534 thereafter.

In a LISP deployment, the mapping servers 522, the mapping databases 524, the mapping caches 526, and the mapping resolvers 528 can maintain the directory of mappings between host identifier and host location and respond to queries for the mappings. In some embodiments, the mapping servers 522, the mapping databases 524, the mapping caches 526, and the mapping resolvers 528 can be co-located but may be deployed as separate architectural components for enabling high availability, distributive processing, and ease of scaling. The mapping servers 522 can receive EID registrations that install the registered EID to RLOC mappings in the mapping database 524. For example, ETRs can register EIDs with their corresponding RLOCs by sending Map-Register messages to the mapping servers 522. Thus, the mapping servers 522 can operate as the interface between ETRs and the LISP mapping system 520. When the mapping servers 522 receive a Map-Register message, they can install the EID to RLOC mappings received by the LISP mapping system 520.

The mapping resolvers 528 can operate as the main interface between ITRs and the LISP mapping system 520 by servicing Map-Requests. For example, when the mapping resolvers 528 receive Map-Requests, they can route the Map-Requests to the authoritative ETR 536 so that the ETRs 536 can respond directly to the Map-Requests. In some cases, the mapping registration may indicate that the mapping servers 522 must reply to a Map-Request rather than forward the requests to the authoritative ETR 536. In these cases, the mapping servers 522 can respond directly to such Map-Requests.

An advantage of the LISP mapping system 520 is that it can achieve high availability without additional protocol messaging. For example, the ETRs 536 can register to multiple mapping servers 522 and request EIDs to RLOC mappings from a different mapping server when one fails. The mapping servers 522 can synchronize their registered entries by receiving their information from a common source (e.g., the authoritative ETRs 536), and thus a database synchronization protocol may not be necessary between the mapping servers 522. In addition, multiple mapping resolvers 528 can share an anycast address. The ITRs 532 can send their mapping requests to this anycast address. The closest mapping resolver 528 to receive the mapping request can process the packet and service the mapping request, providing the mapping resolvers 528 resiliency in a simple manner. It some embodiments, the mapping server 522 and mapping resolver 528 can be co-located on the same physical or virtual device and may be referred to as an MS/MR. Using this approach, multiple MS/MRs can be grouped together to provide high availability.

LISP can offer various other advantages for a network deployment. For example, because LISP separates the identity of the host 206 from its location, the host can retain the same IP address even when mobile within the overlay portion of the network environment 500 (e.g., the Internet 162). When the host 206 moves between LISP sites 502, its locator (e.g., its RLOC or the network address of the network device it is currently located behind) may change but the host's identifier (e.g., its host network address or EID) can remain unaltered. The identifier for the host can then be tracked by the LISP mapping system 520. To aid in scalability, the LISP devices 510 may not need to track the location of every host 206 in the network environment 500 all of the time as they would with a traditional routing protocol. Instead, the LISP devices 510 may query for destinations for which they have actual traffic, which is typically only a small subset of all the hosts in the LISP sites 502. Once queried, this reachability information can be cached in the mapping cache 526 on the source LISP device 510 to reduce the need to query the LISP mapping system 520 again for this information for subsequent traffic to that same destination.

The task of a traditional routing protocol is to flood host information everywhere and ensure that all network devices have a consistent picture of the network at any point in time (e.g., to ensure network convergence). Although this may be feasible for a small collection of aggregated and relatively stable subnet routes, it may not be possible for a large collection of rapidly changing, mobile hosts. Flooding host information to all network devices, in the manner that a traditional routing protocol, can exhaust computing resources (e.g., Central Processing Unit (CPU), Ternary Content Addressable Memory (TCAM) or other memory, etc.) in edge network devices. A traditional routing protocol approach would flood this information to all network nodes, even when many of the network devices involved may not have any traffic destined for many of the hosts in that network. LISP, with its on-demand host lookup capabilities from a centralized mapping system and its ability to cache host information on edge network devices, can more effectively track a large number of mobile hosts in the network. By avoiding the flooding of host information and allowing the destination host's location to be looked up when traffic is actually traversing an edge network device to a given destination, LISP can provide a more scalable solution for host mobility than a traditional routing protocol. LISP can also operate more efficiently with respect to computing resource utilization on edge network devices due to its on-demand lookup nature, which can retrieve and use destination host information from the LISP mapping system 520 when traffic is actually presented for that destination host. This economy of network device resource utilization can be critical for a network deployment given the relatively constrained amount of CPU, TCAM, other memory, and other computing resources typically available for smaller access networks (e.g., the branch office 154).

In this example, the host 206B can be associated with an EID of 10.2.1.2 and an RLOC 3.1.1.1 (e.g., the RLOC of the LISP device 510B). Initially, the host 206B can be located in its "home" EID subnet (e.g., 10.2.1.0/16), which can be the subnet normally defined as attached to the LISP device 510B at RLOC 3.1.1.1. The LISP device 510B can notify the LISP mapping system 520 that the host 206B is attached and active. This can be done when the host 206B first connects to the network environment 500 by a LISP Map-Register request from the LISP device 510B to the LISP mapping system 520. Thus, the LISP mapping system 520 knows where the host 206B is located, and can resolve requests for the host's location that may come in from other LISP devices 510.

Figure 5B:
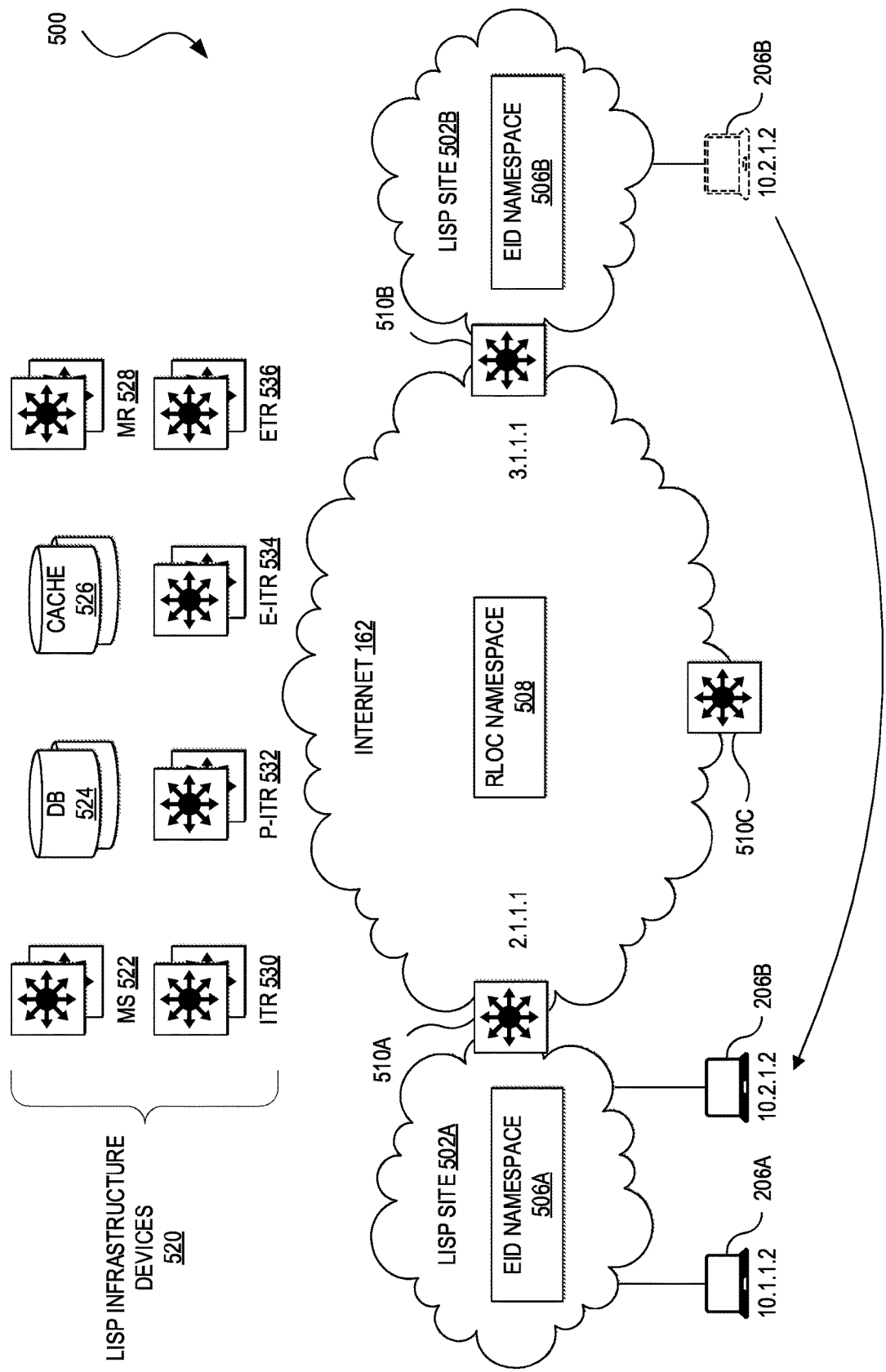

FIG. 5B illustrates an example of a network environment 550 for showing how to implement host mobility in a LISP deployment. In this example, the host 206B has roamed to the LISP site 502A behind the LISP device 510A associated with the RLOC of 2.1.1.1. Such a roam could occur, for example, with a wireless host that is using a distributed wireless data plane termination approach. In this case, the host 206B may wish to keep its existing IP address (e.g., the EID of 10.2.1.2)—but this address does not match the destination subnet present on the LISP device 510A, which may be associated with the 10.1.1.0/16 EID subnet. The LISP device 510A, upon sensing the roam of the host 206B, can send a new Map-Register notification to the LISP mapping system 520, and the LISP mapping system can update its mapping database 524 to indicate that the host 206B is now located at the RLOC of 2.1.1.1 behind the LISP device 510A. The LISP mapping system 520 can also send an update to the LISP device 510B to indicate that the host 206B has roamed and is now located behind the LISP device 510A. The LISP device 510B can update its mapping database 524 to indicate that the host 206B has roamed, and that the host's new location is behind the LISP device 510A at the RLOC of 2.1.1.1. The LISP device 510B can cache this information in its mapping cache 526 for future use. As discussed, caching can reduce the load on the LISP mapping system 520 because previously queried-for destinations can be obtained from the local cache to avoid unnecessary lookups. The LISP device 510B now knows where the host 206B has roamed and that the host is no longer located within the LISP site 502B, and can send traffic intended for the host 206B to the host's new destination.

If another LISP network device (e.g., LISP device 510C) has an older cached entry for the host 206B that points to the LISP device 510B after the host has roamed over to the LISP device 510A, the LISP device 510B may receive traffic for the host from the LISP device 510C. In response, the LISP device 510B can send a Solicit Map-Request message back to the LISP network device 502C. The Solicit Map-Request message can inform the LISP network device 502C that the cached information the LISP network device 502C has is out of date, and the LISP network device 502C can re-query the LISP mapping system 520 for up-to-date mapping information. The LISP network device 502C can receive the updated RLOC for the host 206B, and then update its mapping cache 526 accordingly. This can then allow the LISP network device 502C to forward traffic to the LISP device 510A from that point forward for the host 206B.

Figure 6:
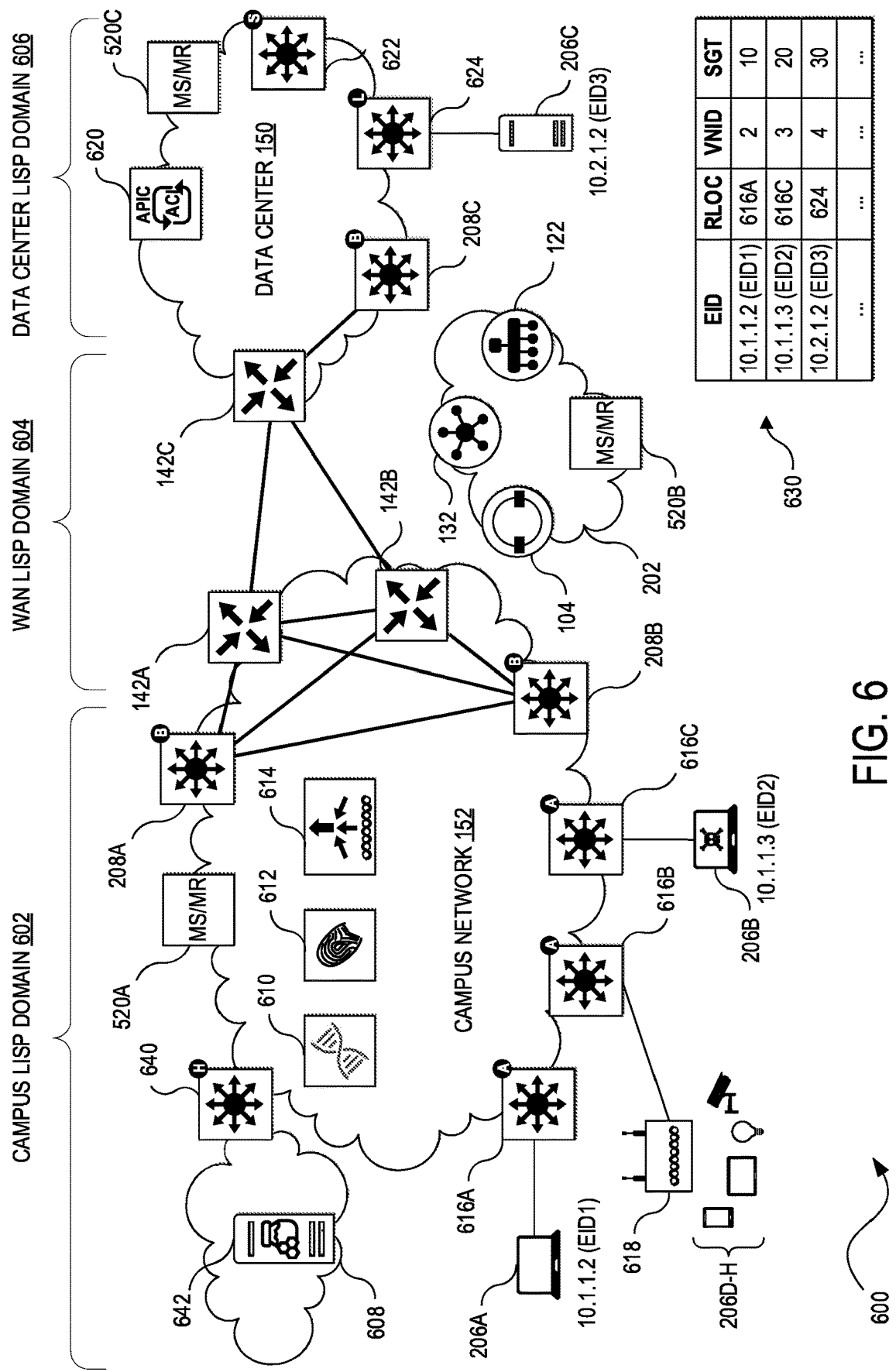
FIG. 6 illustrates an example of a network environment for federating LISP across multiple domains in accordance with an embodiment.

FIG. 6 illustrates an example of a network environment 600 for a federated LISP mapping system or a multi-domain LISP deployment for interconnecting multiple LISP domains. The federated LISP mapping system can be structured hierarchically such that different LISP sites can operate as independent LISP domains but be interconnected by one or more transit networks, which can form a LISP domain themselves. For example, the network environment 600 can comprise LISP site domains including the campus network 152 and a honeypot network 608 in a campus LISP domain 602 and the data center 150 in a data center LISP domain 606, and a LISP transit domain including the WAN management network 202 in a WAN LISP domain 604. Various advantages can flow from integrating LISP between these different domains in this manner, such as normalization of operations derived from using a common protocol throughout the network environment 600, global mobility while maintaining scalability and fate independence across different sites and regions of the network environment, and the ability to focus the operations of certain functions at the right places in the network environment, among others.

Each LISP domain can have its own LISP mapping system, such as the LISP mapping system 520A in the campus LISP domain 602, the LISP mapping system 520B in the WAN LISP domain 604, and the LISP mapping system 520C in the data center LISP domain 606. The federated LISP mapping system or the LISP mapping systems 520A-C in the aggregate (collectively, the LISP mapping system 520) can track the hosts 206 as they attach to their respective LISP domains, and as the hosts roam about the LISP domains. The various network devices in the network environment 600 (e.g., the WAN edge devices 142, the border devices 208, Wireless LAN Controllers (WLCs) 614, access devices 616A-C (collectively, 616), wireless access points 618, spine network devices 622, leaf network devices 608, honeypot network device 640, etc.) may query the LISP mapping system 520 for the locations (i.e., RLOCs) of the hosts 206 attached to their respective domains instead of using a flood and learn mechanism. In addition to tracking specific hosts (e.g., /32 address for IPv4, /128 address for IPv6, etc.), the LISP mapping system can also track summary prefixes (e.g., IP/mask). This flexibility can help in summarization across LISP domains and improve overall scalability.

In some embodiments, the campus LISP domain 602, the WAN LISP domain 604, and the data center LISP domain 606 can share Re-encapsulating Tunnel Routers (RTRs), such as the WAN edge devices 142, the border devices 208, other dedicated LISP devices 510 (not shown), and/or other network devices operating in between LISP domains, to interconnect the network environment 600 via LISP. The WAN edge devices 142, the border devices 208, the dedicated LISP devices 510, and/or other network devices, when configured as RTRs, can receive LISP-encapsulated traffic, de-encapsulate the traffic, issue new lookups, and re-encapsulate the traffic. The RTRs can connect to two or more individual LISP mapping systems. Mappings can be redistributed between the LISP domains at the RTRs to enable EIDs to be reached across domains. These mappings can be held and redistributed in the RTRs' soft memory, and may be installed in the hardware forwarding tables of the RTRs when an active connection requiring the programming of the mapping into the forwarding tables is initiated.

In some embodiments, the LISP domains can be organized hierarchically, and one or more of the LISP site domains (e.g., the campus LISP domain 602 and/or the data center LISP domain 606) may function as stub LISP domains, and the LISP transit domain (e.g., the WAN LISP domain 604) can act as the core LISP domain. The LISP mapping system 520, whether federated and centralized within the WAN LISP domain 604 or distributed across the LISP domains, can operate as a single source of truth about where every host attached to the network environment 600 may be located at any point in time. A table 630 shows an example of an 630 of the mapping database 524 that the LISP mapping system 520 can maintain for mapping host identifier information (e.g., EIDs) to host location information (e.g., RLOCs). For instance, the LISP mapping system 520 can register the host 206A with an EID of 10.1.1.2 (EID1), an RLOC corresponding to the network address for the access device 616A, a VNID of 2, and an SGT of 10; the host 206B with an EID of 10.1.1.3 (EID2), an RLOC corresponding to the access device 616C, a VNID of 3, and an SGT of 20; and the host 206C with an EID of 10.2.1.2 (EID3), an RLOC corresponding to the leaf network device 624, a VNID of 4, and an SGT of 30.

When a LISP site domain is a stub LISP domain, the amount of information exchanged with it can be minimized by using a default path rule to steer traffic toward the RTR connecting to the LISP mapping system 520B (or other core LISP mapping system) to reach other sites. That is, the stub LISP domain can be configured for default routing toward the LISP mapping system 520B (or other core LISP mapping system), and the stub LISP domain may not need to register the transit prefixes. In other embodiments, the LISP mapping system 520B (or other core LISP mapping system) may not need to register the prefixes in the different LISP site domains. Instead, the LISP mapping system 520B (or other core LISP mapping system) may register the EID prefixes at each LISP site as summary prefixes.

The WAN edge devices 142, the border devices 208, the dedicated LISP devices 510, and/or other network devices can operate as the RTRs shared among the LISP domains. The RTRs can determine directionality of the traffic flows being serviced so that they can consult an individual LISP mapping system that is on path to the desired destination. Different implementations can vary in how they determine directionality. In one example, an RTR can have knowledge of the prefixes that are present in its local LISP site, and may direct its requests to the LISP mapping system 520B (or other core LISP mapping system) only for destinations that it does not have listed as being in the local LISP site. Another approach can be to send a Map-Request to all individual LISP mapping systems to which the RTR is connected and determine which Map-Reply to use based on the EID prefix length of the response. A single LISP mapping system on path to the destination will have a more specific match (longest prefix) for a mapping to the destination EID. If two or more LISP mapping systems return a similar length prefix, the responses can be merged into a single mapping with multiple paths.

In some embodiments, the number of mappings registered in the LISP mapping system 520B (or other core LISP mapping system) may require a more scalable design for cross-site mobility and/or deployments in which the LISP mapping system 520B uses host mappings instead of summary EID prefixes. If the LISP mapping system 520B is independent of the LISP mapping systems 520 at the different LISP sites, the LISP mapping system 520B may be implemented as a Delegated Database Tree (DDT). DDT is a mechanism by which a LISP mapping system 520 can be constructed as multiple servers organized in a tree. The structure and navigation of the tree can be similar to that of the Domain Name System (DNS) tree. Each leaf of the tree can be responsible for a particular set of EID prefixes (or the tree can be organized per VPN, VLAN, VNID, VRF, EPG, or other virtual segment). The tree can be navigated from the leaves, up the branches, and toward the root in search of the branch that leads to the authoritative leaf node for the queried EID. Once the leaf is identified, the mapping resolver 528 can forward the Map-Request directly to the authoritative mapping server 522 (e.g., the authoritative leaf in the tree). The DDT can have specific prefixes, VPNs, or other virtual segments anchored to a particular mapping server 522 that has sufficient capacity to handle all possible host routes in the prefixes (or VPNs or other virtual segments) for which it is authoritative. As more prefixes are added, new mapping servers 522 can be added to scale out the capacity of the LISP mapping system 520B.

The campus network 152 can include an access network controller 610 to provide administrative control over the campus network 152 and other campus networks (if any), branch offices 154 (if any), home offices 156 (if any), other sites (if any), and the honeypot network 608. That is, the network controller 610 can have administrative control over these access networks and the network devices of these access networks, such as the border devices 208A-B, the LISP mapping system 520A, Wireless LAN Controller (WLC) 614, access devices 616A-C (collectively, 616), wireless access point 618, honeypot network device 640, and so forth. In Cisco® SD-Access, the network devices under administrative control of the access network controller 610 (e.g., Cisco DNA™ Center) are sometimes referred to as fabric nodes when they are part of an overlay of the access network. For example, the LISP mapping system 520A may be referred to as fabric control plane nodes, the border devices 208A-B may be referred to as fabric border nodes, and the access devices 616 may be referred to as fabric edge nodes of the Cisco® SD-Access fabric.

Intermediate network devices (not shown) that are a part of an underlay network or physical network of the campus network 152 but are not a part of the overlay fabric may be referred to as fabric intermediate nodes. The fabric intermediate nodes can operate as pure Layer 3 forwarders that connect the border devices 208 to the access devices 616 and provide the Layer 3 underlay for fabric overlay traffic. The access devices 616 can connect the hosts 206 to the campus network 152 and can encapsulate/de-encapsulate (e.g., VXLAN) and forward traffic from the hosts to and from the overlay of the campus network 152. The access devices 616 may operate at the perimeter of the fabric of the campus network 152 and can be the first points for attachment of users, devices, and things, and the implementation of policy.

The WLC 614 can support one or more wireless access points 618 attached to the campus network 152 to handle traditional tasks associated with a WLC as well as interactions with the LISP mapping system 520 for wireless endpoint registration and roaming. In some embodiments, the campus network 152 can implement a wireless deployment that moves data-plane termination (e.g., VXLAN) from a centralized location to the access devices 616 and/or the wireless access points 618. This can enable distributed forwarding and distributed policy application for wireless traffic while retaining the benefits of centralized provisioning and administration. In some embodiments, one or more Cisco® Wireless Controllers, Cisco® Wireless LAN, and/or other Cisco DNA™-ready wireless controllers can operate as the WLC 614. The wireless access point 618 can link to the access device 616B to provide network connectivity to wireless hosts (e.g., the wireless hosts 206D-H). In some embodiments, Cisco Aironet® access points, Cisco Meraki® MR access points, and/or other Cisco DNA™-ready access points can operate as the wireless access points 618.

The campus network 152 can also include Authentication, Authorization, and Auditing (AAA) system 612. The AAA system 612 can control access to computing resources, facilitate enforcement of network policies, audit usage, and provide information necessary to bill for services. The AAA system 612 may coordinate with the campus network controller 610, the WAN controller 132, a data center network controller, and databases and directories containing information for users, devices, things, policies, billing, and similar information to provide authentication, authorization, and accounting services. In this example, the AAA system 612 can function as the centralized authority for identity and access to the campus network 152 and the branch office 154. However, it will be appreciated that the AAA system 612 can also be co-located in the data center 150, the other sites 158, or other networks (e.g., a co-location center, a Cloud Service Provider network (e.g., IaaS, PaaS, SaaS, etc.) in other embodiments. The AAA system 612 can utilize various technologies, such as Remote Authentication Dial-In User Service (RADIUS), Diameter, and the like, to communicate with hosts, network devices, applications, and so on. An example of an implementation of the AAA system 612 is the Cisco® Identity Services Engine (ISE).

User identity, group or organizational identity, user location, client device type, and other contextual information regarding users can be shared across the network environment 600 via the AAA system 612. For example, the AAA system 612 can share this information via Application Programming Interfaces (APIs) (e.g., Restful State Transfer (REST) APIs, Software Development Kits (SDKs) for a programming language such as C++, GO, JAVA, JAVASCRIPT, NODE.JS, PHP, PYTHON, RUBY, etc.), etc.), Command Line Interfaces (CLIs), web applications (e.g., applications accessible via web browsers), desktop applications, mobile applications or "apps," and other suitable interfaces. In some embodiments, the AAA system 612 can map user or group identifier in one representation, such as an SGT, to another representation, such as an EPG, or vice versa.

The WAN management network 202 can include the network orchestrator appliance 104, the network management appliance 122, the network controller appliance 132, and the LISP mapping system 520B. Although the WAN management network 202 is shown as a single network in this example, one of ordinary skill in the art will understand that each component of the WAN management network 202 (including the LISP mapping system 520B) can be distributed across any number of networks and/or be co-located with the campus network 152, the branch office 154, or other sites 158 (not shown). Each component of the WAN management network 202 can be reached through any transport network (e.g., the Internet transport network 162, the MPLS network 164, the LTE network 166, etc.) (not shown).

The data center 150 can include a data center network controller 620 (e.g., Cisco APIC™) to provide administrative control over the data center 150 and other data centers (if any). That is, the data center network controller 620 can have administrative control over one or more data centers and the network devices of the data centers, such as one or more spine network devices 622 and one or more leaf network devices 624 (including the border device 208C, which may be referred to as a border leaf in the Cisco ACI™ platform). In some embodiments, the spine network devices 622 and the leaf network devices 624 (including the border leaf 208C) can be deployed in a full-mesh topology or spine-and-leaf topology.

In general, the data center network controller 620 can provide a centralized point of automation and management, policy programming, application deployment, and health monitoring for the data center 150. The data center network controller 620 may operate in combination with one or more virtual machine managers (e.g., VMware vSphere®, Microsoft® System Center Virtual Machine Manager, etc.), container orchestrators (e.g., Linux Foundation Kubernetes®, Docker Swarm®, Apache Mesos®, Mesosphere® Marathon, etc.)/service meshes (e.g., Linux Foundation Envoy™, Istio®, Linux Foundation Linkerd®, Hashicorp Consul®, etc.), or other virtualization managers (not shown) for deploying virtual machines, containers, or other virtual servers (not shown). The virtual machine manager can be used to administer a virtual switch (e.g., Cisco® Application Virtual Switch (AVS), Cisco ACI™ Virtual Edge, Cisco Nexus® 1000VE, Cisco Nexus® 1000V, Open Virtual Switch (OVS), etc.), hypervisor, and one or more virtual machines (not shown) instantiated on a single physical server (e.g., the host 206C); a distributed virtual switch or multiple virtual switches, multiple hypervisors, and multiple virtual machines spanning multiple physical servers (not shown); or other virtual machine computing environments (not shown). Similarly, the container orchestration/service mesh can be used to administer a virtual switch (e.g., OVS, OVS with Intel® Data Plane Development Kit (DPDK), OVS with Contiv plugin, etc.), container engine (e.g., Docker®, CoreOS® rkt, Linux® Containers (LXC), etc.), and one or more containers (not shown) instantiated on a single physical server (e.g., the host 206C); a distributed virtual switch or multiple virtual switches, multiple container engines, multiple container orchestrators, multiple service meshes, and multiple containers spanning multiple physical servers or virtual machines (not shown); and other containerized computing environments (not shown).

The spine network devices 622 can operate as the backbone of the data center 150 and interconnect the leaf network devices 624. For example, every leaf network device 624 can connect to every spine network device 622 in the data center 150, and the paths within the data center 150 may be randomly chosen so that the traffic load can be evenly distributed among the spine network devices 622. In this manner, network performance may only slightly degrade if one of the spine network devices 622 fails. If oversubscription of a link occurs (e.g., if more traffic is generated than can be aggregated on an active link at one time), network capacity can be scaled up by adding an additional spine network device 622 and extending uplinks to every leaf network device 624. This can add inter-layer bandwidth and reduce oversubscription. If access port capacity becomes an issue, a new leaf network device 624 can be added by connecting it to every spine network device 622 and adding the network configuration to the new leaf network device 624. If no oversubscription occurs between the leaf network devices 624 and their uplinks, then a non-blocking architecture can be achieved.

The leaf network devices 624 can include fabric ports and access ports (non-data center fabric ports). The fabric ports can provide the uplinks to the spine network devices 622, while the access ports can provide connectivity to the hosts 206. The leaf network devices 604 can also connect the data center 150 to other network appliances and services, such as a firewall or other network security appliance or service (e.g., Cisco® Advanced Malware Protection (AMP) appliance, Cisco® Industrial Security Appliance (ISA), Cisco® Adaptive Security Appliance (ASA), Cisco® Identity Services Engine (ISE) appliance, Cisco Firepower® appliance, Cisco® Content Security Management appliance, Cisco® Security Packet Analyzer, etc.); network analytics appliance (e.g., Cisco Tetration Analytics™ appliances); application accelerator; Network Address Translation (NAT) device; load balancer; Distributed Denial of Service (DDoS) mitigator; Deep Packet Inspection (DPI) device; Intrusion Prevention System (IPS); Intrusion Detection System (IDS); Internet Protocol Security (IPSec) system; Session Border Controller (SBC); traffic monitor; Evolved Packet Core (EPC) device; WAN optimizer; and so forth. These network appliances and services can be implemented in hardware as physical network appliances and/or in software using general-purpose Central Processing Units (CPUs), Graphics Processing Units (GPUs), Network Processing Units (NPUs), Network Interface Controllers (NICs), smart NICs, and so forth (e.g., virtualized network appliances and services executing within virtual machines (e.g., Virtual Network Functions (VNFs)), containers (e.g., Cloud-Native Network Functions (CNFs)), or other virtual servers) (not shown). In some embodiments, the data center network controller 620 can provide automatic service insertion based on policies defined by an administrator of the data center 150. The data center network controller 620 can use service graphs (e.g., ordered sets of service function nodes between a set of endpoints and a set of network appliances or service specified for an application) to push the needed configuration and security policies to the data center 150.

In some embodiments, the leaf network devices 604 can also connect EPGs (not shown) to the data center 150 and other networks (e.g., the transport networks 160). EPGs can be groupings of applications, or application components, and tiers for implementing forwarding and policy logic. EPGs can allow for separation of network policy, security, and forwarding from addressing by using logical application boundaries. EPGs can be used in the data center 150 for mapping applications in the data center. For example, EPGs can comprise a grouping of hosts in the data center 150 indicating connectivity and policy for applications.

Another advantage of the LISP mapping system 520 is improved end-to-end network security. As discussed, the deployment of LISP in the campus LISP domain 602, the WAN LISP domain 604, and the data center domain 606 can enable the LISP mapping system 520 to operate as the single source of truth at all times about the locations of the hosts 206 within the network environment 600. This allows an administrator to design and deploy simple but effective policies to improve end-to-end network security. For example, an administrator can create one or more honeypot policies for dynamically connecting hosts seeking unauthorized access to the network environment 600 to one or more honeypot servers 642. In general, a honeypot is a computer security mechanism that can detect, deflect, or otherwise counteract attempts at unauthorized access to a network. The honeypot server 642 can appear to be a legitimate host of the network environment 600 but it is actually isolated within the honeypot network 608 by the honeypot network device 640 and/or other security network appliances, and monitored by the honeypot network device 640 and/or other security network appliances. Monitoring of activity between a would-be attacker and the honeypot server can provide critical security information, such as identity information regarding the would-be attacker, location information of the would-be attacker, security vulnerabilities the would-be attacker has exploited or attempts to exploit, malware that the would-be attacker attempts to install onto the honeypot server, a pattern of the would-be attacker's behavior, and so forth. An administrator can use this information to further secure the network, such as by blacklisting identified attackers from identity or location information, closing discovered security vulnerabilities, generating a signature from malware to provide as input to an IPS/IDS (e.g., Cisco Firepower®), generating a signature from a pattern of behavior to provide to a threat analytics system (e.g., Cisco® AMP, Cisco Cloudlock®, Cisco® Cognitive Threat Analytics, Cisco® Network Assurance Engine, Cisco Stealthwatch®, Cisco Talos®, Cisco Tetration Analytics™, Cisco Umbrella™, etc.), and so on.

An example of a first honeypot policy that an administrator may deploy in the network environment 600 can be enforced by the LISP mapping system 520 when it receives a request for resolution of an unknown host identifier (e.g., an EID that is not within the mapping database of the LISP mapping system 520). Upon detecting this condition, the policy can call for the LISP mapping system 520 to respond to the request with a Map-Reply including an RLOC of the honeypot network device 640. In addition, the LISP mapping system 520 can add to its mapping database an entry mapping the unknown identifier to the honeypot network device 640 for the first honeypot policy to propagate throughout the network environment 600 when there are other attempts to connect to the unknown identifier. In some embodiments, the first honeypot policy or another honeypot policy can also provision a virtual server (e.g., virtual machine, container, etc.) to operate as the honey server 642, and assign the unknown host identifier to the newly provisioned honeypot server. In other embodiments, the honeypot server 642 can be a dedicated (physical or virtual) server having its own IP address. In these cases, the first honeypot policy or another honeypot policy can cause the honeypot network device 640 to perform a destination network address translation on the unknown host identifier to an IP address of the dedicated honeypot server 642 in order to keep the IP address of the honeypot server 642 fixed. A conventional policy may simply drop traffic to unmapped hosts but instead of dropping such traffic, the first honeypot policy and other honeypot policies can facilitate counter-intelligence gathering that may help to further secure the network.

An example of a second honeypot policy that an administrator may deploy can be applied by one or more network devices of the network environment 600 (e.g., the WAN edge devices 142, the border devices 208, the access devices 616, the leaf network devices 624, etc.) to forward traffic destined for an unknown host identifier to the honeypot server 642. There are a number of ways this can be achieved. For example, once the LISP mapping system 520 maps one or more unknown host identifiers to the RLOCs of one or more honeypot network devices 640, the network devices can enforce the second honeypot policy to forward traffic whose destination matches the unknown host identifiers, the honeypot servers 642, the honeypot network devices 640, and/or the honeypot network 608 to the honeypot servers 642. As another example, one or more other second honeypot policies can be deployed and enforced by the honeypot network device 640 to forward VXLAN traffic or traffic utilizing another specified type of encapsulation (e.g., GRE, mGRE, Encapsulated Remote Switched Port Analyzer (ERSPAN), etc.) to the honeypot server 642 if other network devices in the network environment 600 are configured to encapsulate traffic destined for an unknown identifier in VXLAN (or other specified type of encapsulation) and to forward the encapsulated traffic to the honeypot network device 640.

An example of a third honeypot policy may include a traffic policing or traffic engineering policy. Traffic policing or traffic engineering policies can limit the input or output transmission rate of a class of traffic defined according to specified criteria and/or mark packets by setting the IP precedence value, the Quality of Service (QoS) group, or Differentiated Services Control Point (DSCP) value of packets. The third honeypot policy can throttle traffic destined for the unmapped host identifier, the honeypot server 642, the honeypot network device 640, and/or the honeypot network 608 to ensure these network nodes have sufficient capacity to process received traffic. Alternatively or in addition, the third honeypot policy or another honeypot policy can provision additional instances of the honeypot server 642 and/or the honeypot network device 640 within the honeypot network 608 when currently provisioned computing resources are insufficient to handle the traffic destined for the unknown host identifier. For instance, the honeypot server 642 can be configured as a virtual server (e.g., virtual machine, container, etc.) and/or the honeypot network device 640 can be configured as a virtual network device (e.g., virtual switch, router, server or network load-balancer, etc.) in an isolated part of the network environment 600 or in a cloud service provider network (not shown). When one or more of the honeypot server 642, the honeypot network device 640, or the honeypot network 608 determine that current computing resources (e.g., CPU, memory, storage, network bandwidth, etc.) are insufficient to satisfy current demand, then additional computing resources can be provisioned to handle the additional load.

In this example, the host 206B can represent a compromised host that attempts to access other hosts within the network environment 600 by probing for EIDs within its EID subnet. The compromised host 206B, assigned an EID of 10.1.1.3 (EID2), can attempt to send traffic to an unregistered host in the campus network 152, such as to the EID of 10.1.1.4 (EID4) (not shown). The access device 616C can receive the traffic, and request for resolution of EID4 with a Map-Request to the LISP mapping system 520A. The LISP mapping system 520A can perform a lookup for EID4 but will be unable to locate EID4 in its mapping database.

In some cases, the LISP mapping system 520A can query the LISP mapping system 520B for resolution of EID4 (e.g., if the LISP mapping system 520A is a stub LISP domain, and the LISP mapping system 520B is a core LISP domain). However, the LISP mapping system 520B will also be unable to locate EID4 in its mapping database either directly (e.g., when the LISP mapping system is the authoritative mapping system for EID4) or indirectly (e.g., when another LISP mapping system is the authoritative mapping system for EID4). In other cases, the LISP mapping system 520A can be the authoritative mapping for EID4. In any of these cases, none of the mapping databases will include EID4, and the LISP mapping system 520 can apply the first honeypot policy to resolve EID4 to the RLOC of the honeypot network device 640.

The access device 616C can receive the RLOC of the honeypot network device 640 in a Map-Reply from the LISP mapping system 520, encapsulate the traffic using VXLAN, and forward the traffic onto the honeypot network device 640. The honeypot network device 640 can de-encapsulate the VXLAN-encapsulated traffic, and apply the second honeypot policy to forward the traffic to the honeypot server 642. When the LISP mapping system detects a legitimate host assigned to EID4 attaching to the network environment 600, the access device 616 to which the legitimate host attaches can register EID4 to the LISP mapping system 520, and the mapping information for EID4 can be propagated throughout the network environment 600 such that traffic destined for EID4 is no longer routed toward the honeypot network device 640.

In another scenario, the compromised host 206B can attempt to send traffic to a non-existent host in the data center 150, such as to the EID of 10.2.1.3 or EID5. The access device 616C can receive the traffic and request for resolution of EID5 with a Map-Request to the LISP mapping system 520A. The LISP mapping system 520A can perform a lookup for the mapping EID5 but will be unable to locate EID5 in its mapping cache. The LISP mapping system 520A can query the LISP mapping system 520B for resolution of EID5. However, the LISP mapping system 520B will also be unable to locate EID5, either directly (e.g., when the LISP mapping system 520B is the core LISP mapping system in a federated LISP mapping system or the authoritative mapping system for EID5) or indirectly (e.g., when another LISP mapping system is the authoritative mapping system for EID5). The LISP mapping system 520B can apply the first honeypot policy to resolve EID5 to the RLOC for the honeypot network device 640. The access device 616C can receive the RLOC for the honeypot network device 640 in a Map-Reply from the LISP mapping system 520B, encapsulate the traffic using VXLAN, and forward the traffic onto the honeypot network device 640. The honeypot network device 640 can de-encapsulate the VXLAN-encapsulated traffic, apply the second honeypot policy to forward the traffic to the honeypot server 642. When the LISP mapping system 520 detects a legitimate host assigned to EID5 attaching to the network environment 600, the access device 616 to which the legitimate host attaches can register EID5 to the LISP mapping system 520, and the mapping information for EID4 can be propagated throughout the network such that traffic destined for EID5 is no longer routed toward the honeypot network device 640.

In yet another scenario, the host 206A, assigned an EID of 10.1.1.2 (EID1) and an RLOC corresponding to the access device 616A, may exit the campus network 152. Legitimate hosts (e.g., the host 206C) and illegitimate hosts (e.g., the host 206B) alike can attempt to send traffic to the host 206A during this period of time. The LISP mapping system 520 will have outdated entries for EID1 in their mapping caches and/or mapping databases pointing to the RLOC corresponding to the access device 616A. When the access device 616A receives traffic destined for EID1, the access device 616A can send a Solicit Map-Request message back to the sending access devices 616 to trigger new map requests. When the LISP mapping system 520 receive the Solicit Map-Request message but are unable to locate the host 206A anywhere else in the network, the LISP mapping system 520 can update their mapping caches and/or mapping databases with no address for EID1 to cause any traffic destined for EID1 to be dropped while the host 206A remains disconnected from the network. Thus, traffic destined for an identifier of a legitimate host that is not currently connected within the network environment 600 can be dropped instead of routed toward the honeypot network device 640. When the host 206A returns to the campus network 152, the access device 616 to which the host attaches can register EID1 to its local LISP mapping system 520, and the mapping information for EID1 can be propagated throughout the network such that traffic destined for EID1 is no longer dropped.

Figure 7:
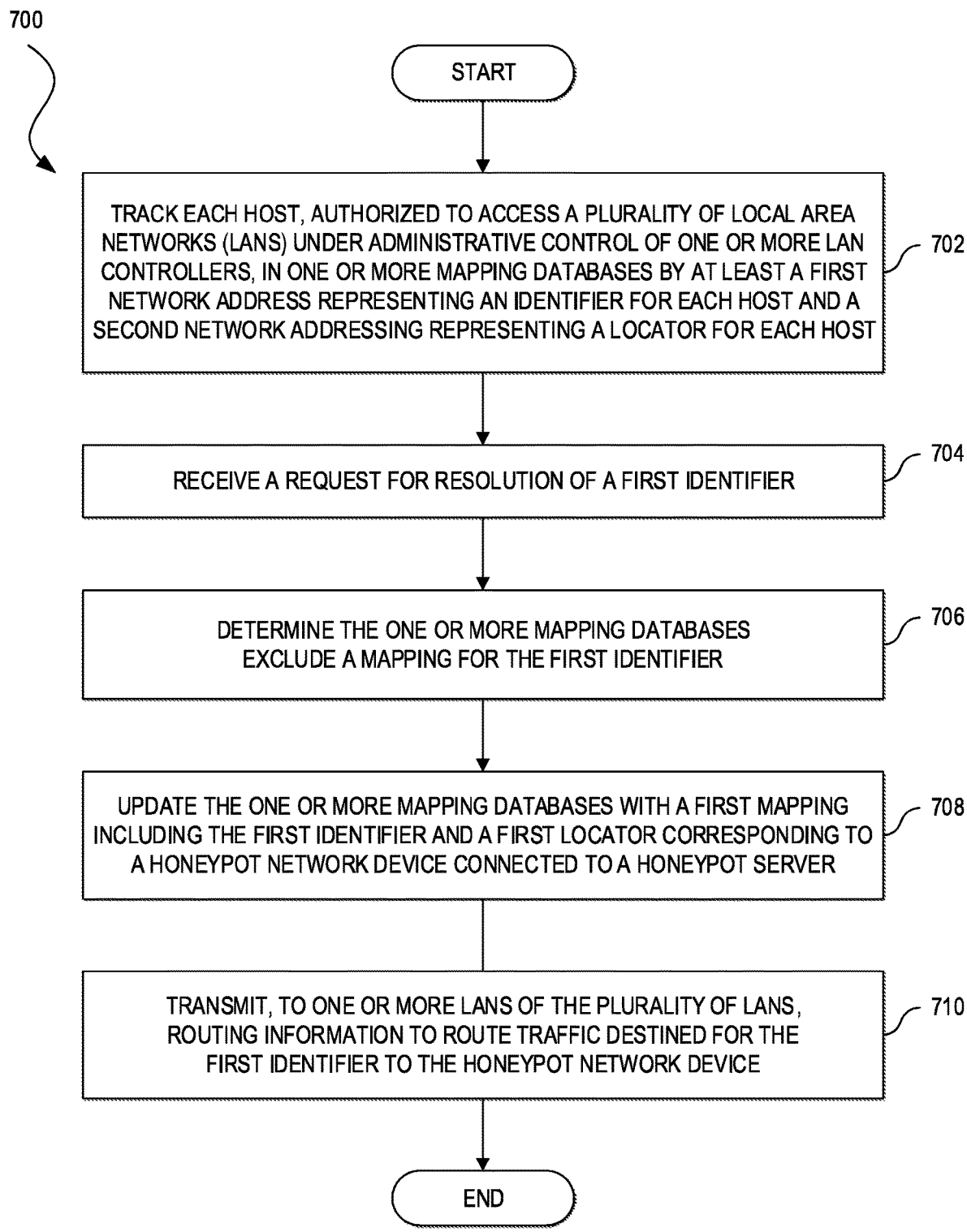
FIG. 7 illustrates an example of a process for improving network security by dynamically generating honeypots in accordance with an embodiment.

FIG. 7 illustrates an example of a process 700 for connecting WAN edge devices to provide for high availability and extensibility in accordance with an embodiment. One of ordinary skill will understood that, for any processes discussed herein, there can be additional, fewer, or alternative steps performed in similar or alternative orders, or in parallel, within the scope of the various embodiments unless otherwise stated.

The process 700 can begin with a step 702 in which a mapping system can track, in one or more mapping databases, each host (e.g., endpoint, computing system, computing device, etc.) that is authorized to access a plurality of LANs, such as a data center, a campus network, a branch office, a home office, or other network in which nodes (e.g., hosts, network devices, subnets, networks, etc.) can connect directly (e.g., single hop) or indirectly (e.g., multiple hops) to one another without a transport network (e.g., an MPLS, Internet, LTE, or other WAN service provider network). The LANs can also sometimes be referred to as access networks, fabric sites, or WAN sites. In the mapping databases, the hosts may be tracked by at least a first network address representing an identifier for each host (e.g., a EID) and a second network addressing representing a locator for each host (e.g., an RLOC, TLOC, VTEP, etc.). In some embodiments, the hosts may also be tracked by their virtual network segmentation information (e.g, VPN, VLAN, VNID, VRF, EPG, etc.) or by their user or group information (e.g., SGT).

In some embodiments, the mapping system can be a part of a federated LISP mapping system or a multi-domain LISP deployment for interconnecting multiple LISP domains. The federated LISP mapping system can be structured hierarchically such that different LISP sites can operate as independent LISP domains but be interconnected by one or more transit networks, which can form a LISP domain themselves. For example, the federated LISP mapping system can comprise LISP site domains including one or more campus networks, branch offices, home offices, and other sites in a campus LISP domain; one or more data centers in a data center LISP domain; and a LISP transit domain including the WAN platform in a WAN LISP domain.

Each LISP domain can have its own LISP mapping system comprising one or more mapping servers (e.g., LISP Map-Servers), mapping databases (sometimes also referred to as an HTDB), mapping caches, mapping resolvers (e.g., LISP Map-Resolvers), ITRs, P-ITRs, P-ETRs, Egress Tunnel Routers, etc.). The components of each LISP mapping system can be separate physical or virtual devices, can be incorporated within a single LISP device, or can be incorporated in multiple LISP devices.

The federated LISP mapping system or the individual LISP mapping system of each LISP domain in the aggregate can track the hosts as they attach to their respective LISP domains, and as the hosts roam about the LISP domains. The various network devices in the network (e.g., WAN edge devices, border devices, WLCs, access devices, wireless access points, spine network devices, leaf network devices, etc.) may query the federated LISP mapping system or the individual LISP mapping system of each LISP domain in the aggregate for the locations (i.e., RLOCs) of the hosts attached to their respective domains instead of using a flood and learn mechanism. Thus, the federated LISP mapping system or the individual LISP mapping system of each LISP domain in the aggregate can operate as a single source of truth about where every host attached to the network may be located at any point in time. This feature can be leveraged to improve end-to-end network security by simple and effective policies.

For example, an administrator can deploy a first policy such that when the mapping system receives a request for resolution of a first identifier that is an unknown host identifier (e.g., an EID that is not within the mapping database of the mapping system), the mapping system can respond with a Map-Reply including an RLOC of the honeypot network device. When an attempt at unauthorized access to the first identifier occurs, at step 704, the mapping system can receive the request for resolution of the first identifier. As there is no entry in the mapping database for the first identifier, at step 706, the mapping system can determine that the mapping database excludes a mapping of the first identifier. At step 708, the mapping system can also update the mapping database with a first mapping including the first identifier and a network address corresponding to the honeypot network device.

Steps 706 and 708 can result in, at step 710, the mapping system transmitting, to one or more LANs of the plurality of LANs, routing information to route traffic destined for the first identifier to the honeypot network device. For example, a compromised host attempting unauthorized access to an unknown identifier can trigger a Map-Request for that identifier, which can return the RLOC of honeypot network device. Another policy matching on a class corresponding to one or more of the first identifier, the honeypot server, or the honeypot network device can route the traffic matching on this class to the honeypot network device. In another example, a policy can be applied by one or more network devices (e.g., the access devices 616, the leaf network devices 624, etc.) such that the network devices may encapsulate traffic destined for an unknown identifier in VXLAN (or other specified type of encapsulation), and to forward the encapsulated traffic to the honeypot server. A complementary policy can be applied by the honeypot network device, such as the honeypot network device forwarding VXLAN traffic (or traffic of another specified type of encapsulation).

In some embodiments, the mapping system can determine that a host, authorized to access the plurality of LANs and assigned to the first identifier, has connected to a first access device of a first LAN of the plurality of LANs. The mapping system can update its mapping database with a second mapping including the first identifier and a second locator corresponding to the first access device. The mapping system can transmit, to one or more LANs of the plurality of LANs, second routing information to route second traffic destined for the first identifier to the first access device In some embodiments, the mapping system can receive a request for resolution of a second identifier. The mapping system can determine, from its mapping database, that the second identifier is assigned to a host that is authorized to access the plurality of LANs. The mapping system can determine, from the one or more mapping databases, that the host is not connected to the plurality of LANs. The mapping system can update its mapping database with a second mapping including the second identifier and a second locator corresponding to a null address. The mapping system can transmit, to one or more LANs of the plurality of LANs, second routing information to drop second traffic destined for the second identifier.

In some embodiments, a honeypot policy can also be deployed and applied by a network controller (e.g., an access network controller, a WAN controller, a data center controller, etc.) to provision a virtual server (e.g., virtual machine, container, etc.) to operate as the honeypot server, and assign the unknown host identifier to the newly provisioned honeypot server. In other embodiments, the honeypot server can be a dedicated (physical or virtual) server having its own IP address. In these cases, a honeypot policy can cause the honeypot network device to perform a destination network address translation on the unknown host identifier to an IP address of the dedicated honeypot server in order to keep the IP address of the honeypot server fixed.

In some embodiments, a honeypot policy can be deployed and implemented by a network controller to provision at least one of an additional instance of the honeypot server or an additional instance of the honeypot network device when it is determined that at least one of the honeypot server or the honeypot network device has insufficient capacity to process the traffic destined for the first identifier. This can be especially advantageous when the honeypot server is deployed in a cloud service provider network or other network that is isolated from an internal network. In addition, the honeypot policy can also call for the network controller to transmit information to the honeypot network device to load-balance the traffic destined for the first identifier between at least one of the honeypot server and the additional instance of the honeypot server or the honeypot network device and the additional instance of the honeypot network device.

In some embodiments, a traffic policing policy can be implemented by a network controller to limit transmission of a class of traffic corresponding to the first identifier, the honeypot server, or the honeypot network device.

Figure 8:
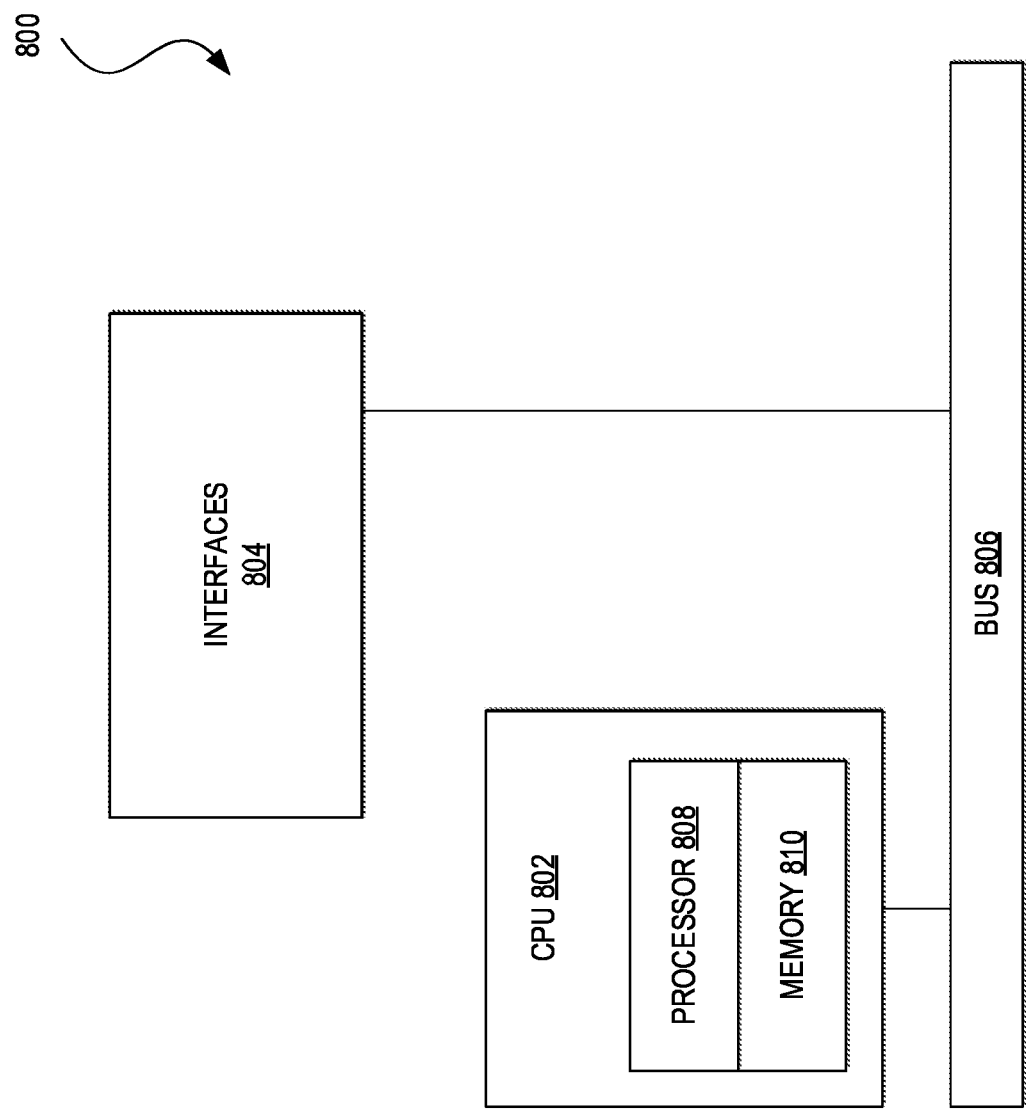
FIG. 8 illustrates a block diagram of an example of a network device in accordance with an embodiment.

FIG. 8 illustrates an example of a network device 800 (e.g., switch, router, network appliance, etc.). The network device 800 can include a master central processing unit (CPU) 802, interfaces 804, and a bus 806 (e.g., a Peripheral Component Interconnect (PCI) bus). When acting under the control of appropriate software or firmware, the CPU 802 can be responsible for executing packet management, error detection, and/or routing functions. The CPU 802 preferably accomplishes all these functions under the control of software including an operating system and any appropriate applications software. The CPU 802 may include one or more processors 808 such as a processor from the Motorola family of microprocessors or the MIPS family of microprocessors. In an alternative embodiment, the processor 808 can be specially designed hardware for controlling the operations of the network device 800. In an embodiment, a memory 810 (such as non-volatile Random Access Memory (RAM) and/or Read-Only Memory (ROM)) can also form part of the CPU 802. However, there are many different ways in which memory could be coupled to the system.

The interfaces 804 can be provided as interface cards (sometimes referred to as line cards). The interfaces 804 can control the sending and receiving of data packets over the network and sometimes support other peripherals used with the network device 800. Among the interfaces that may be provided are Ethernet interfaces, frame relay interfaces, cable interfaces, DSL interfaces, token ring interfaces, and the like. In addition, various very high-speed interfaces may be provided such as a fast token ring interface, wireless interface, Ethernet interface, Gigabit Ethernet interface, Asynchronous Transfer Mode (ATM) interface, High-Speed Serial Interface (HSSI), Packet Over SONET (POS) interface, Fiber Distributed Data Interface (FDDI), and the like. The interfaces 804 may include ports appropriate for communication with the appropriate media. In some cases, the interfaces 804 may also include an independent processor and, in some instances, volatile RAM. The independent processors may control communication intensive tasks such as packet switching, media control, and management. By providing separate processors for the communication intensive tasks, the interfaces 804 may allow the CPU 802 to efficiently perform routing computations, network diagnostics, security functions, and so forth.

Although the system shown in FIG. 8 is an example of a network device of an embodiment, it is by no means the only network device architecture on which the subject technology can be implemented. For example, an architecture having a single processor that can handle communications as well as routing computations and other network functions, can also be used. Further, other types of interfaces and media may also be used with the network device 800.

Regardless of the network device's configuration, it may employ one or more memories or memory modules (including the memory 810) configured to store program instructions for general-purpose network operations and mechanisms for roaming, route optimization, and routing functions described herein. The program instructions may control the operation of an operating system and/or one or more applications. The memory or memories may also be configured to store tables such as mobility binding, registration, and association tables.

Figure 9A:
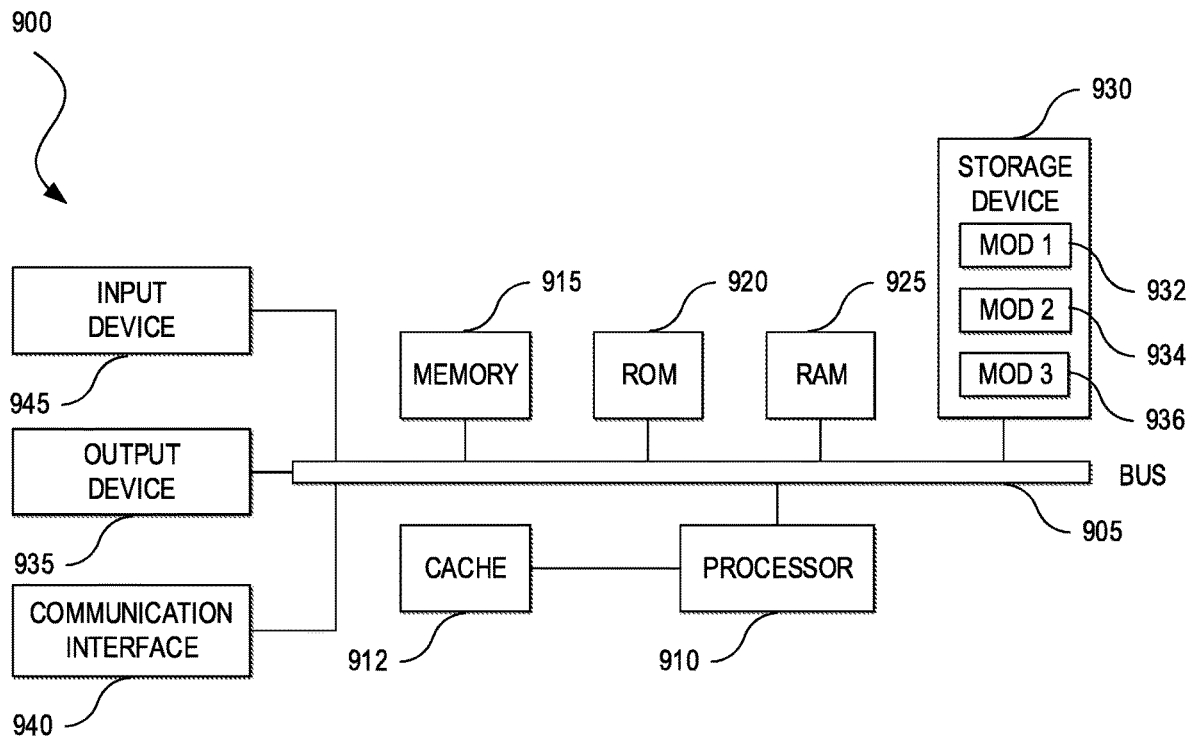
FIGS. 9A and 9B illustrate block diagrams of examples of computing systems in accordance with some embodiments.
Figure 9B:
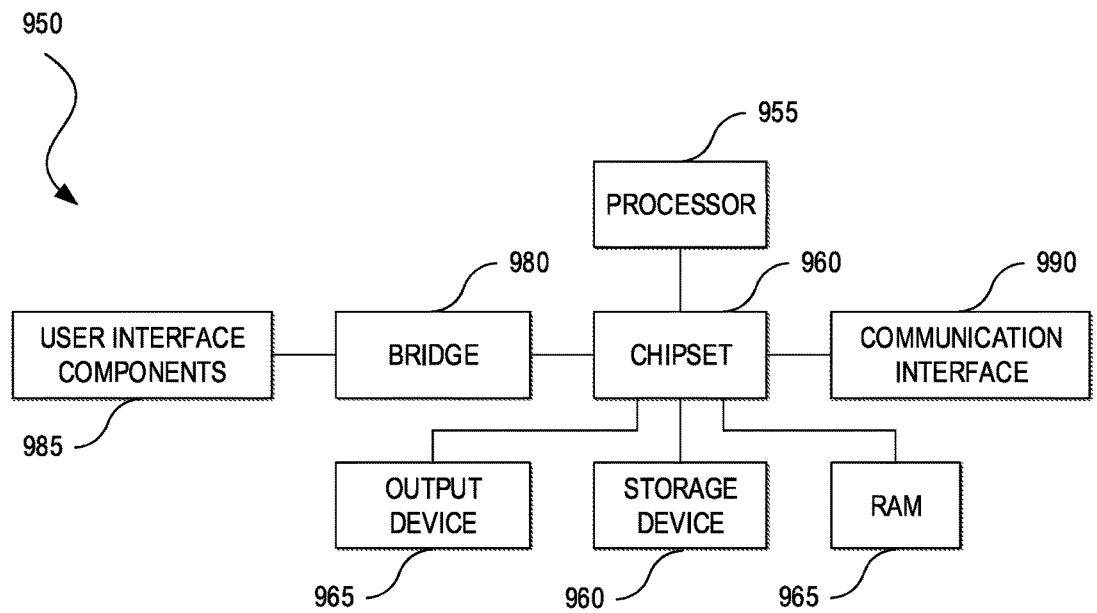

FIG. 9A and FIG. 9B illustrate systems in accordance with various embodiments. The more appropriate system will be apparent to those of ordinary skill in the art when practicing the various embodiments. Persons of ordinary skill in the art will also readily appreciate that other systems are possible.

FIG. 9A illustrates an example of a bus computing system 900 wherein the components of the system are in electrical communication with each other using a bus 905. The computing system 900 can include a processing unit (CPU or processor) 910 and a system bus 905 that may couple various system components including the system memory 915, such as read only memory (ROM) 920 and random access memory (RAM) 925, to the processor 910. The computing system 900 can include a cache 912 of high-speed memory connected directly with, in close proximity to, or integrated as part of the processor 910. The computing system 900 can copy data from the memory 915, ROM 920, RAM 925, and/or storage device 930 to the cache 912 for quick access by the processor 910. In this way, the cache 912 can provide a performance boost that avoids processor delays while waiting for data. These and other modules can control the processor 910 to perform various actions. Other system memory 915 may be available for use as well. The memory 915 can include multiple different types of memory with different performance characteristics. The processor 910 can include any general purpose processor and a hardware module or software module, such as module 1 932, module 2 934, and module 3 936 stored in the storage device 930, configured to control the processor 910 as well as a special-purpose processor where software instructions are incorporated into the actual processor design. The processor 910 may essentially be a completely self-contained computing system, containing multiple cores or processors, a bus, memory controller, cache, etc. A multi-core processor may be symmetric or asymmetric.

To enable user interaction with the computing system 900, an input device 945 can represent any number of input mechanisms, such as a microphone for speech, a touch-protected screen for gesture or graphical input, keyboard, mouse, motion input, speech and so forth. An output device 935 can also be one or more of a number of output mechanisms known to those of skill in the art. In some instances, multimodal systems can enable a user to provide multiple types of input to communicate with the computing system 900. The communications interface 940 can govern and manage the user input and system output. There may be no restriction on operating on any particular hardware arrangement and therefore the basic features here may easily be substituted for improved hardware or firmware arrangements as they are developed.

The storage device 930 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 930 can include the software modules 932, 934, 936 for controlling the processor 910. Other hardware or software modules are contemplated. The storage device 930 can be connected to the system bus 905. In some embodiments, a hardware module that performs a particular function can include a software component stored in a computer-readable medium in connection with the necessary hardware components, such as the processor 910, bus 905, output device 935, and so forth, to carry out the function.

FIG. 9B illustrates an example architecture for a chipset computing system 950 that can be used in accordance with an embodiment. The computing system 950 can include a processor 955, representative of any number of physically and/or logically distinct resources capable of executing software, firmware, and hardware configured to perform identified computations. The processor 955 can communicate with a chipset 960 that can control input to and output from the processor 955. In this example, the chipset 960 can output information to an output device 965, such as a display, and can read and write information to storage device 970, which can include magnetic media, solid state media, and other suitable storage media. The chipset 960 can also read data from and write data to RAM 975. A bridge 980 for interfacing with a variety of user interface components 985 can be provided for interfacing with the chipset 960. The user interface components 985 can include a keyboard, a microphone, touch detection and processing circuitry, a pointing device, such as a mouse, and so on. Inputs to the computing system 950 can come from any of a variety of sources, machine generated and/or human generated.

The chipset 960 can also interface with one or more communication interfaces 990 that can have different physical interfaces. The communication interfaces 990 can include interfaces for wired and wireless Local Area Networks (LANs), for broadband wireless networks, as well as personal area networks. Some applications of the methods for generating, displaying, and using the technology disclosed herein can include receiving ordered datasets over the physical interface or be generated by the machine itself by the processor 955 analyzing data stored in the storage device 970 or the RAM 975. Further, the computing system 950 can receive inputs from a user via the user interface components 985 and execute appropriate functions, such as browsing functions by interpreting these inputs using the processor 955.

It will be appreciated that computing systems 900 and 950 can have more than one processor 910 and 955, respectively, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, Universal Serial (USB) devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A computer-implemented method comprising:
   tracking one or more hosts authorized to access a plurality of networks by at least a first network address representing an identifier for each host and a second network addressing representing a locator for each host;
   receiving a request for resolution of a first identifier;
   determining that the first identifier is excluded in a mapping;
   updating the mapping with the first identifier and a first locator corresponding to a honeypot network device connected to a honeypot server; and
   transmitting, to one or more networks of the plurality of networks, routing information to route traffic destined for the first identifier to the honeypot network device.

2. The computer-implemented method of claim 1, further comprising:
   determining a host, authorized to access the plurality of networks and assigned to the first identifier, has connected to a first access device of a first network of the plurality of networks;
   updating the mapping with the first identifier and a second locator corresponding to the first access device; and
   transmitting, to one or more networks of the plurality of networks, second routing information to route second traffic destined for the first identifier to the first access device.

3. The computer-implemented method of claim 1, further comprising:
   receiving a request for resolution of a second identifier;
   determining, from the mapping, that the second identifier is assigned to a host that is authorized to access the plurality of networks;
   determining, from the mapping, that the host is not connected to the plurality of networks;
   updating the mapping with the second identifier and a second locator corresponding to a null address; and
   transmitting, to one or more networks of the plurality of networks, second routing information to drop second traffic destined for the second identifier.

4. The computer-implemented method of claim 1, further comprising:
   provisioning a virtual server to operate as the honeypot server; and
   assigning the first identifier to the honeypot server.

5. The computer-implemented method of claim 1, further comprising:
   transmitting, to the honeypot network device, information to perform a destination network address translation, on the traffic destined for the first identifier, from the first identifier to a network address of the honeypot server.

6. The computer-implemented method of claim 1, further comprising:
   determining that at least one of the honeypot server or the honeypot network device has insufficient capacity to process the traffic destined for the first identifier; and
   provisioning at least one of an additional instance of the honeypot server or an additional instance of the honeypot network device; and
   transmitting information to the honeypot network device to load-balance the traffic destined for the first identifier between at least one of the honeypot server and the additional instance of the honeypot server or the honeypot network device and the additional instance of the honeypot network device.

7. The computer-implemented method of claim 1, further comprising:
   transmitting, to the one or more networks of the plurality of networks, a traffic policing policy to limit transmission of a class of traffic corresponding to the first identifier, the honeypot server, or the honeypot network device.

8. The computer-implemented method of claim 1, wherein the mapping further includes virtual network segmentation information.

9. The computer-implemented method of claim 1, wherein the mapping further include user or group identifier information.

10. The computer-implemented method of claim 1, wherein the honeypot server is located in a cloud service provider network.

11. A system, comprising:
one or more processors; and
memory including instructions that, when executed by the one or more processors, cause the system to:
track one or more hosts authorized to access a plurality of networks by at least a first network address representing an identifier for each host and a second network addressing representing a locator for each host;
receive a request for resolution of a first identifier;
determine that the first identifier is excluded in a mapping;
update the mapping with the first identifier and a first locator corresponding to a honeypot network device connected to a honeypot server; and
transmit, to one or more networks of the plurality of networks, routing information to route traffic destined for the first identifier to the honeypot network device.

12. The system of claim 11, further comprising instructions which when executed by the or more processors, cause the system to:
determine a host, authorized to access the plurality of networks and assigned to the first identifier, has connected to a first access device of a first network of the plurality of networks;
update the mapping with the first identifier and a second locator corresponding to the first access device; and
transmit, to one or more networks of the plurality of networks, second routing information to route second traffic destined for the first identifier to the first access device.

13. The system of claim 11, further comprising instructions which when executed by the or more processors, cause the system to:
receive a request for resolution of a second identifier;
determine, from the mapping, that the second identifier is assigned to a host that is authorized to access the plurality of networks;
determine, from the mapping, that the host is not connected to the plurality of networks;
update the mapping with the second identifier and a second locator corresponding to a null address; and
transmit, to one or more networks of the plurality of networks, second routing information to drop second traffic destined for the second identifier.

14. The system of claim 11, further comprising instructions which when executed by the or more processors, cause the system to:
provision a virtual server to operate as the honeypot server; and
assign the first identifier to the honeypot server.

15. The system of claim 11, further comprising instructions which when executed by the or more processors, cause the system to:
transmit, to the honeypot network device, information to perform a destination network address translation, on the traffic destined for the first identifier, from the first identifier to a network address of the honeypot server.

16. The system of claim 11, further comprising instructions which when executed by the or more processors, cause the system to:
determine that at least one of the honeypot server or the honeypot network device has insufficient capacity to process the traffic destined for the first identifier; and
provision at least one of an additional instance of the honeypot server or an additional instance of the honeypot network device; and
transmit information to the honeypot network device to load-balance the traffic destined for the first identifier between at least one of the honeypot server and the additional instance of the honeypot server or the honeypot network device and the additional instance of the honeypot network device.

17. The system of claim 11, further comprising instructions which when executed by the or more processors, cause the system to:
transmit, to the one or more networks of the plurality of networks, a traffic policing policy to limit transmission of a class of traffic corresponding to the first identifier, the honeypot server, or the honeypot network device.

18. The system of claim 11, wherein the mapping further includes virtual network segmentation information.

19. A non-transitory computer-readable storage medium including instructions that, when executed by one or more processors of a system, cause the system to:
track one or more hosts authorized to access a plurality of networks by at least a first network address representing an identifier for each host and a second network addressing representing a locator for each host;
receive a request for resolution of a first identifier;
determine that the first identifier is excluded in a mapping;
update the mapping with the first identifier and a first locator corresponding to a honeypot network device connected to a honeypot server; and
transmit, to one or more networks of the plurality of networks, routing information to route traffic destined for the first identifier to the honeypot network device.

20. The non-transitory computer-readable storage medium of claim 19, further comprising further instructions that, when executed by the one or more processors, further cause the system to:
determine a host, authorized to access the plurality of networks and assigned to the first identifier, has connected to a first access device of a first network of the plurality of networks;
update the mapping with the first identifier and a second locator corresponding to the first access device; and
transmit, to one or more networks of the plurality of networks, second routing information to route second traffic destined for the first identifier to the first access device.

* * * * *